United States Patent
Kerber

(10) Patent No.: US 8,568,538 B2
(45) Date of Patent: *Oct. 29, 2013

(54) NANOPARTICLE SURFACE TREATMENT

(75) Inventor: Susan J. Kerber, Sussex, WI (US)

(73) Assignee: Material Interface, Inc., Sussex, WI (US)

(*) Notice: Subject to any disclaimer, the term of this patent is extended or adjusted under 35 U.S.C. 154(b) by 0 days.

This patent is subject to a terminal disclaimer.

(21) Appl. No.: 13/491,990

(22) Filed: Jun. 8, 2012

(65) Prior Publication Data

US 2012/0251742 A1 Oct. 4, 2012

Related U.S. Application Data

(63) Continuation of application No. 11/452,779, filed on Jun. 14, 2006, now Pat. No. 8,197,613.

(60) Provisional application No. 60/690,311, filed on Jun. 14, 2005.

(51) Int. Cl.
C23C 28/00 (2006.01)
C23C 8/80 (2006.01)

(52) U.S. Cl.
USPC .......................... 148/276; 148/277

(58) Field of Classification Search
None
See application file for complete search history.

(56) References Cited

U.S. PATENT DOCUMENTS

| | | |
|---|---|---|
| 2,846,325 A | 8/1958 | Bennett et al. |
| 3,357,868 A | 12/1967 | Tanczyn |
| 6,656,602 B1 | 12/2003 | Ishikawa et al. |
| 2002/0137872 A1 | 9/2002 | Schneider et al. |
| 2004/0026261 A1 | 2/2004 | Stoffer et al. |

OTHER PUBLICATIONS

Ahniyaz, et al. "Low-Temperature Direct Synthesis of CeO2-ZrO2 Solid Solution Nanoparticles by a Hydrothermal Method" J. of Nanoscience and Nanotechnology, 4 233-238 (2004).
Antill, et al. "Influence of an alloy addition of yttrium on the oxidation behavior of an austenitic and a ferritic stainless steel in carbon dioxide" J. Iron Steel Inst. 205, 1136-1142 (1967).
Atkinson, et al. "The Diffusion of Fe3+ in Amorphous SiO2 and the Protective Properties of SiO2 Layers" Corros. Sci 21:49-58 (1981).
Balducci, et al "An unusual promotion of the redox behavior of CeO2-ZrO2 solid solutions upon sintering at high temperatures" Catalysis Lett, vol. 33, pp. 193-200 (1995).
Box & Draper, et al. Empirical Model Building and Response Surfaces, John Wiley & Sons Inc. (1987) pp. 99-102.
Buscail, et al. "The influence of cerium surface addition on low-pressure oxidation of pure iron at high temperatures" Solid State Ionics 92:243-51 (1996).
Cabanas, et al. "Continuous hydrothermal synthesis of inorganic materials in a near-critical water flow reactor; the one-step synthesis of nano-particulate Ce1-xZrxO2 (x=0-1) solid solutions" J. Mater. Chem. 11, 561 (2001).
Chen, et al. "Homogenous precipitation of cerium dioxide nanoparticles in alcohol/water mixed solvents" Colloids and Surfaces A; 242 (2004) 61-69.

(Continued)

*Primary Examiner* — Patrick Ryan
*Assistant Examiner* — Yoshitoshi Takeuchi
(74) *Attorney, Agent, or Firm* — Casimir Jones, S.C.

(57) ABSTRACT

The present invention relates to methods and compositions for reducing damaging oxidation of metals. In particular, the present invention relates to nanoparticle surface treatments and use of nanoparticle surface treatments to reduce the damaging oxidation and corrosion of stainless steel and other alloy components in oxidating and corrosive conditions.

14 Claims, 27 Drawing Sheets

(56) References Cited

OTHER PUBLICATIONS

Colon, et al. "Surface and Structural characterization of CexZr1-xO2 CEZIRENCAT mixed oxides as potential three-way catalyst promoters" J. Chem. Soc. Faraday Trans., 94, 3717-26 (1998).

Duffy, et al. "Theoretical studies of diffusion processes down coincident tilt boundaries in NiO" Phil. Mag. A 54, 759-771 (1986).

Giggins, et al. "Factors affecting adhesion of oxide scales on alloys" Metall. Trans. 5, 1685-1688 (1974).

He "Aluminizing Coating and Aluminizing-Y2O3 Coating Deposited by Pulsed Spark" J. Rare Earths, 19:204 (2001).

Hu, et al. "Sol-Gel and Ultrafine Particle Formation via Dielectric Tuning of Inorganic Salt-Alcohol-Water Solutions" J. of Colloid and Interface Science., 222, 20-36 (2000).

Hussey, et al. "The Effect of Ceria Coatings on the High-temperature Oxidation of Iron-Chromium Alloys" Mater. Sci. Engg. A120:147 (1989).

Kuznetsova, et al. "Methane transformation into syngas over Ce-Zr-O systems: role of the surface/bulk promoters and oxygen mobility" Catalysis Today, 91-92 (2004) 161-164.

Li et al. "Synthesis of CeO2 nanoparticles by mechanochemical processing and the inhibiting action of NaCl on particle agglomeration" Materials Letters 59 (2005) 48-52.

Liu, et al. "Modeling of oxidation kinetics of Y-doped Fe-Cr-Al Alloys" Oxidation of Metals (2000) 53(3/4), 341-349.

Mitra, et al. "Influence of superficial coating of CeO2 on the oxidation behavior of AISI 304 stainless steel" Oxid. Met. (1993) 39(3/4), p. 221-229.

Nagai, et al. "The influence of dispersion and superficial application of rare earth oxides on the high temperature oxidation of Fe-20Cr sintered alloy" Funtai oyobi Funmatsu Yakin (1987) 34(5), p. 222-228.

Patil, et al. "Nanocrystalline Ceria Imparts Better High Temperature Protection" Proc. R. Soc. Lond. (2004) vol. 460, pp. 3569-3587.

Patil, et al. "Synthesis of nanocrystalline ceria particles for high temperature oxidation resistant coating" Journal of Nanoparticle Research, vol. 4, pp. 433-438 (2002).

Paul, et al. "Low cost rare earth elements deposition method for enhancing the oxidation resistance at high temperature of Cr2O3 and Al2O3 forming alloys" J. Alloys and Compounds vol. 323-4, pp. 70-73 (2001)11452779.

Pint "High temperature corrosion behavior of iron aluminide alloys and coatings" NTIS report, contract AC05-00OR22725, (2001) and other NTIS reports.

Pint "Optimization of reactive-element additions to improve oxidation performance of alumina-forming alloys" J. American Ceramic Society, 86, 686-695 (2003).

Pint, et al. DOE publication entitled "Defining Failure criteria for extended lifetime metallic coatings" available from the Internet site of DOE, 2002.

Ravi, et al. "The Effect of Mischmetal Addition on the Structure and Mechanical Properties of a Cast Al-7Si-0.3Mg Alloy Containing Excess Iron (up to 0.6 Pct)" Metallurgical and Materials Transactions A., vol. 33, pp. 391-400 (2002).

Riffard, et al. "Effect of yttrium addition by sol-gel coating and ion implantation on the high temperature oxidation behavior of the 304 steel" Applied Surface Science, 199, 107-122 (2002).

Riffard, et al. "Yttrium Addition Effect on Isothermal and Cyclic High Temperature Oxidation Behaviour of 304 Stainless Steel" Surface Engineering, 20, 440-446 (2004).

Seal, et al. "Studies on the surface chemistry of oxide films formed on IN-738LC super alloy at elevated temperatures in dry air" Oxid. Met. 56, 583-603 (2001).

Seal, et al. "Surface chemistry of oxide scale on IN-738LC superalloy: effect of long term exposure in air at 1173 K" Oxid. Met 57, 297-322 (2002).

Seal, et al. "Ceria based high temperature coatings for oxidation prevention" J. Mater. (Electronic) 52(1), 1-8 (2000).

Seal, et al. "Improvement in the oxidation behavior of austenitic stainless steels by superficially applied cerium oxide coatings" Oxid. Met. 41, 139-178 (1994).

Shen, et al. "Effect of superficially applied ceria on high temperature oxidation behavior of Fe25Cr alloy" Sci. Prot. Tech. (1992) 4(4) 289-294.

Shen, et al. "Effects of surface-applied ceria on the stability of thermally growing chromia scale of FeCr alloys and 310 steel" J. Mater. Sci 33:5815 (1998).

Simon, et al. "Effects of Silica Nano-Particle Coatings on High-Temperature Oxidation of AISI 321" Materials Science Forum, V461-464, 281-288 (2004).

Stott "Influence of alloy additions on oxidation" Mater. Sci. Tech. 5:734 (1989).

Stringer "Coatings in the electricity supply industry: past, present, and opportunities for the future" Surface and Coatings Technology 108-109 1-9 (1998).

Stringer "The reactive element effect in high-temperature corrosion" Mater. Sci. Eng. A120, 129-137 (1989).

Stringer, et al. "The effect of thoria dispersion on the high temperature oxidation of chromium" Corros. Sci. 12, 625-636 (1972).

Sundarajan, et al. "High temperature corrosion of nanoceria coated 9Cr-1Mo ferritic steel in air and steam" Surface & Coatings Technology, vol. 201, pp. 2124-2130 (2006).

Tien, et al. "Mechanism of oxide adherence on Fe-25Cr-4Al (Y or Sc) alloys" Metall. Trans. 3, 1587-1599 (1972).

Trovarelli, et al. "Design better cerium-based oxidation catalysts" Chemtech, Jun., pp. 32-37 (1997).

Viswanathan, et al. "Materials for Ultrasupercritical Coal Power Plants-Boiler Materials: Parts 1 and 2" J. Mater. Eng. Performance, vol. 10, pp. 81-101 (2001).

Wang, et al. "Corrosion Inhibition of 304 Stainless Steel by Nano-Sized Ti/Silicone Coatings in an Environment containing NaCI and Water Vapor at 400-600° C" Oxidation of Metals, 62 (2004) 1-13.

Silverman, "Tutorial on Classification Nos. of Various Alloy Families," Argentum Solutions Inc.—Sterling Guidance on Corrosion Materials and Degradation, as accessed on Sep. 21, 2011.

A

B

FIG 5. LIFETIME PREDICTION MODEL FOR 430 STAINLESS STEEL - UNCOATED 430 VS. COATED WITH NANOCERIA.

A

B

B

A

NANOPARTICLE SURFACE TREATMENT

The present application is a continuation of allowed U.S. patent application Ser. No. 11/452,779, filed Jun. 14, 2006, which claims priority to Provisional Application Ser. No. 60/690,311, filed Jun. 14, 2005, each of which is incorporated herein by reference.

FIELD OF THE INVENTION

The present invention relates to methods and compositions for forming a protective coating on alloys, reducing oxide scale spallation and corrosion of metals. In particular, the present invention relates to nanoparticle surface treatments and methods of using the surface treatments to form a self-protective oxide on alloys, thereby reducing corrosion and damaging oxidation of stainless steel and other metal and alloy components.

BACKGROUND OF THE INVENTION

Improving the longevity of metals such as stainless steel at elevated temperatures is of critical importance. The service life of many alloys, including stainless steel, can be limited by the growth of damaging oxide scale that exfoliates (spalls) during operation and ultimately that contributes to component failure. Corrosion conditions at elevated temperatures exacerbate the material loss. The corrosion and damaging oxidation of steel and other alloys presents problems in numerous applications. For example, in power generation applications, typical examples of problems associated with such damaging oxidation include: (1) accelerated high-temperature fire-side corrosion associated with the presence of molten alkali-containing salts; (2) accelerated medium-temperature fire-side corrosion associated with the presence of a low oxygen activity environment and sulfur; and (3) steam-side oxidation of tubing, piping and valves in fossil fuel-fired boilers. There is an emerging pressure to increase the efficiency of fossil fuel power plants while at the same time meet stringent environmental regulations and ensure plant reliability, availability and maintainability, all at low cost. (Stott, Mater. Sci. Tech. 5:734 [1989]).

Steam temperature is one of the key factors that controls plant efficiency and the emission gas. Increasing the steam operating temperature and pressure will increase the plant efficiency while reducing emission gasses (Viswanathan, J. Mater. Eng. Performance 10:81 [2001]). The former provides the financial advantage by reducing the operating cost with increased power production, and the latter makes the process more eco-friendly by decreasing the emission of hazardous gases such as $SO_2$, $CO_2$, and $NO_x$. For example, using 538° C./18 MPa (steam temperature/pressure) steam plant condition as a base, an efficiency increase of nearly 6% can be achieved by changing the steam condition to about 593° C./30 MPa. At 650° C. this would be as much as 8%. Ecologically, an increase in 1% efficiency of an 800 MW plant would lead to the lifetime reduction in $CO_2$ approaching 1 million tons (Viswanathan, 2001, supra). Clearly, there is a need for improved corrosion and oxidation resistance of steel and other alloys in the power generation industry. The benefits of improved resistance of steel and other alloys to corrosion and damaging oxidation are not limited to the power generation industry. The benefits of improvements in operation efficiency and increased component service life apply across countless applications and industries in which such steel and alloy components are used.

The alloys used in high temperature systems must possess good mechanical properties along with resistance to corrosion and damaging oxidation. However, it is not easy for a single alloy to have all these properties and to still provide ease of manufacturing. Alloys are often treated, e.g., by vacuum heating, to produce a thin, protective oxide layer on the surface of the metal. Although iron, nickel and cobalt-base alloys have been considered for high temperature applications, metal oxides of these elements are not protective enough when the working temperature exceeds 550° C. The addition of other elements such as chromium, aluminum and silicon has improved their corrosion resistance because of the establishment of more protective oxide layers ($Cr_2O_3$, $Al_2O_3$ and $SiO_2$). These oxide layers not only offer a better protection because of low growth rate, they also are effective barriers against ion migration (Atkinson & Gardner, Corros. Sci 21:49 [1981]). However, the threshold amounts of these elements required for the alloy to form a continuous protective oxide layer depends upon the alloying elements and application, and these additions to alloys can have a deleterious effect on the mechanical properties of the alloy. Although chromium has a lesser effect on mechanical properties than aluminum and silicon, iron alloys require approximately 12% chromium to form a continuous chromium oxide film in air and to therefore protect against damaging oxidation (Stott 1989, supra). However, in steam environment the amount of Cr required is around 25% to form a complete protective chromium oxide layer (Otsuka, Sumitomo Met. 44:30 [1992]).

There remains a need for surface treatments to and methods of providing such treatments to improve the performance and service life of steel and other alloys used in oxidating and corrosive environments.

SUMMARY OF THE INVENTION

The present invention relates to methods and compositions for reducing damaging oxidation and/or corrosion of metals. In particular, the present invention relates to surface treatments and methods of using the treatments such that treated substrates (e.g., stainless steel and other alloy components) develop self-protective oxide coatings and thereby have greater resistance to damaging oxidation and corrosion under extreme conditions, such as elevated temperatures.

The present invention provides methods and compositions for the treatment of metal surfaces, e.g., stainless steel surfaces, to improve resistance to damaging oxidation and corrosion. In some embodiments, the present invention provides nanoparticle surface treatments to provide substrates (e.g., metals) with improved resistance to damaging oxidation at high temperature and in steam environments. The protected metals of the present invention find use in a variety of industrial and commercial applications. The present invention further provides systems and devices incorporating protected metal and methods of using the systems and devices.

Accordingly, in some embodiments, the present invention comprises a composition comprising a metal treated with a nanoparticle surface treatment, wherein said composition comprises a self-protective oxide coating. In some embodiments, the present invention provides a composition comprising a metal treated with a nanoparticle surface treatment, wherein the composition exhibits reduced damaging oxidation relative to untreated metal. In some embodiments, the nanoparticle surface treatment comprises nanoceria. In other embodiments, the nanoparticle surface treatment comprises an oxide of an element including, but not limited to, aluminum, silicon, scandium, titanium, yttrium, zirconium, niobium, lanthanum, hafnium, tantalum, or thorium, or other rare earth elements (or combinations of those elements). In certain embodiments, the metal is stainless steel (e.g., austenitic (304, 316, or 321), ferritic (e.g., 430 or 409), and martensitic (e.g., 410) stainless steel). In other embodiments, the metal is a nickel alloy (e.g., Inconel 600 or 625 or alloy 200/201). In still further embodiments, the metal is an aluminum alloy (e.g. alloy 2014). In preferred embodiments, the composition is resistant to spalling in oxidating conditions (e.g., high temperature and/or steam conditions, for example, in a steam generating power plant). In some embodiments, the metal is resistant to corrosion in corrosive conditions (e.g., salt and acid environments). The present invention is not limited to particular compositions having reduced susceptibility to damaging oxidation and/or corrosion. Non-limiting examples include, but are not limited to, metals in fossil energy system components, heat exchangers, reheater pipes, solar collectors/panels, refrigeration and heating equipment, vacuum and gas chambers, hydrogen fuel cell components, flame stabilizers, surgical components, fan accessories, inlet-outlet transitions, heat treating furnace components, aircraft and other vehicle components including, but not limited to, cables, wires or bearing rods, and tubular elements such as ductwork and piping.

The present invention further provides a method of protecting metal from damaging oxidation, comprising providing metal treated with a nanoparticle surface treatment, and exposing the treated metal to conditions such that a self-protective oxide coating is formed on the treated metal. In some embodiments, the present invention comprises a method of reducing oxide spalling of a metal, comprising providing a metal coated with a nanoparticle surface treatment; and exposing the metal to oxidating conditions under conditions such that damaging oxidation of the metal is reduced relative to damaging oxidation in the absence of the surface treatment. In some embodiments, the nanoparticle surface treatment comprises nanoceria. In other embodiments, the nanoparticle surface treatment comprises an oxide of an element including, but not limited to, cerium, titanium, lanthanum, and aluminum, silicon, scandium, yttrium, zirconium, niobium, hafnium, tantalum, and thorium plus other rare earth elements (or combinations of these elements). In certain embodiments, the metal is stainless steel (e.g., austenitic (304, 316, or 321), ferritic (e.g., 430 or 409), and martensitic (e.g., 410) stainless steel). In other embodiments, the metal is a nickel alloy (e.g., Inconel 600 or 625 or alloy 200/201). In still further embodiments, the metal is an aluminum alloy (e.g. alloy 2014). In some embodiments, the oxidizing conditions comprise high temperature and/or steam conditions (e.g., a steam generating power plant). The present invention in not limited to particular metals for protection from damaging oxidation and/or corrosion. Non-limiting examples include, but are not limited to, metals in fossil energy system components, heat exchangers, reheater pipes, solar collectors/panels, refrigeration and heating equipment, vacuum and gas chambers, hydrogen fuel cell components, flame stabilizers, surgical components, fan accessories, inlet-outlet transitions, heat treating furnace components, automotive and aircraft components including, but not limited to, cables, wires or bearing rods, and tubular elements such as ductwork and piping.

Embodiments of the invention are described in this summary, and in the Detailed Description of the Invention, below, which is incorporated here by reference. Although the invention has been described in connection with specific embodiments, it should be understood that the invention as claimed should not be unduly limited to such specific embodiments.

Definitions

As used herein, the term "self protective," as used herein in reference to an oxide coating or film, e.g., on a metal surface, refers to an oxide film formed from the metal that acts to protect the metal, e.g., from damaging oxidation and/or corrosion. The composition of the oxide film depends on the alloy on which it forms.

As used herein, the term "nanocrystalline" refers to a crystalline coating or surface treatment with an average particle size smaller than 100, and preferably 20, and even more preferably 10 nm.

As used herein, the terms "reduced damaging oxidation relative to an untreated metal" and "under conditions such that damaging oxidation of said metal is reduced relative to damaging oxidation in the absence of said surface treatment" refer to a metal treated with a composition of the present invention (e.g., a nanoparticle surface treatment) that exhibits reduced damaging oxidation (e.g., reduced growth of oxide scale, reduced spalling) at high temperatures and/or high moisture conditions relative to the damaging oxidation observed on the same metal in the absence of the surface treatment.

As used herein, the term "damaging oxidation" refers to oxidation that is deleterious to a substrate (e.g., a metal object or surface). For example, growth of oxide scale to the point of roughening, spalling, the creation of voids susceptible to corrosion, or any other effect that is deleterious to the substrate (e.g., to the function, performance, material properties, or usable lifetime of the substrate) is damaging oxidation.

As used herein, the terms "reduced corrosion relative to an untreated metal" and "under conditions such that corrosion of said metal is reduced relative to corrosion in the absence of said surface treatment" refer to a metal treated with a composition of the present invention (e.g., a nanoparticle surface treatment) that exhibits reduced corrosion at in corrosive conditions (e.g., salt conditions, acid conditions) relative to the corrosion observed on the same metal in the absence of the treatment or surface treatment.

As used herein, the term "oxidating conditions" refers to conditions that promote damaging oxidation of metals (e.g., high temperatures, steam conditions or other chemical reactions.)

As used herein, the term "corrosive conditions" refers to conditions that promote damaging corrosion of metals (e.g., high temperatures, steam conditions, salt conditions, or other chemical reactions.)

The term "nanoceria" as used herein refers to nanoparticles of cerium oxide.

The term "nanoparticle" as used herein refers to particles having an average particle size of less than about 1 micrometer. In preferred embodiments, nanoparticles have an average size of less than about 0.1 micrometer (100 nm) and in particularly preferred embodiments, nanoparticles have an average size of less than about 10 nm.

The term "coating" as used herein refers to a layer on a substrate (e.g., a metal component or part). The invention is not limited by the mechanism of forming the coating. A coating may be formed by the application of a composition (e.g. a nanoparticle composition) to a substrate, or a coating may arise from a treatment of a sample, e.g., the formation of a self-protective oxide coating. In some embodiments an entire surface of a substrate is coated, which in other embodiments, a portion of a substrate surface is coated.

The term "surface treatment" as used herein refers to application of a composition to the surface of a substrate (e.g., application of a composition to a metal component or part), or to a composition on the surface of a substrate (e.g., a substrate that has a surface treatment (e.g., a coating)).

The terms "coated" and "treated," as used herein in reference to surface treatments are used interchangeably.

DESCRIPTION OF THE DRAWINGS

FIG. 2A shows a comparison of low mass gain of nanoceria-coated 430 stainless compared to mass gain of uncoated 321 and AL453 stainless steels manufactured specifically for resistance to damaging oxidation, with the lower mass gain indicative of reduced oxidation. FIG. 2B shows intact protective oxide coating on the 430 stainless after heating to 800° C. in air for 216 hours.

FIG. 15A shows such resistance to damaging oxidation on 304 stainless steel, while 14B shows resistance on 410 stainless steel.

FIG. 24A: nanocrystalline coated Ni 600 alloy was heated in air to 1000° C. for over 500 hours. The oxide is dense, thin, and adherent (original 100×). FIG. 24B: untreated Ni 600 alloy was heated in air to 1000° C. for over 500 hours. Oxide scale is blistered, flaked, and porous and has multiple protrusions. FIG. 24C shows microvoids under blistered oxide of uncoated Ni 600 alloy, which are ideal sites for corrosion (original 1000×). Such corrosion nucleation sites are absent in the nanocrystalline-surface treated material.

DETAILED DESCRIPTION OF THE INVENTION

Figure 1:
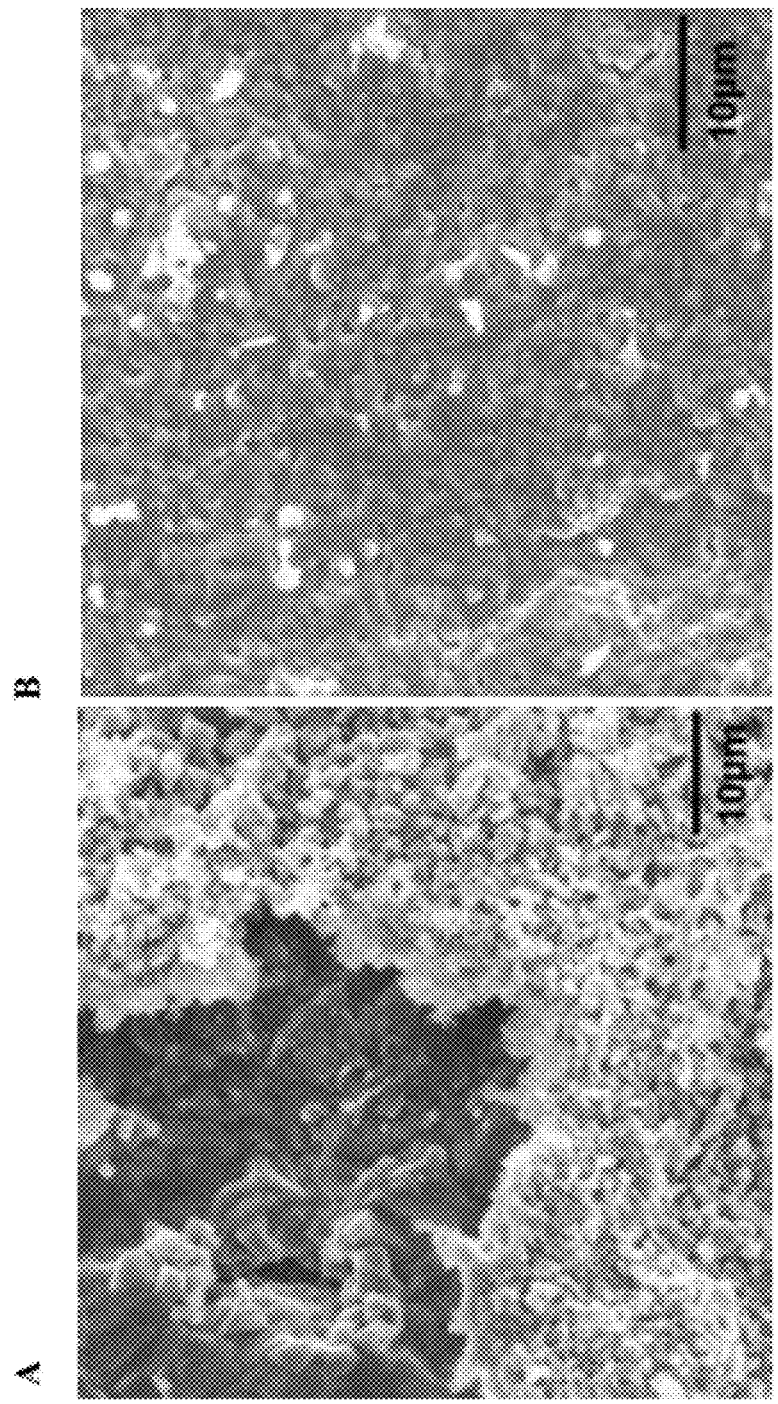
FIG. 1A shows 316 stainless steel; heated in air to 1000° C. for 34 hours.
FIG. 1B shows 316 stainless steel coated with nanoceria surface treatment, and heated in air to 1000° C. for 34 hours.

The present invention relates to methods and compositions for the formation of self-protective surfaces on metals, thereby reducing the damaging oxidation and corrosion of metals. In particular, the present invention relates to nanoparticle surface treatments and methods of using the surface treatments to reduce the damaging oxidation and corrosion of stainless steel and other alloy components at elevated temperatures or under other damaging conditions. In some embodiments, the present invention relates to nanoparticle surface treatments and methods of using surface treatments to produce beneficial oxide layers (e.g., thin and non-spalling) on stainless steel and other alloy components at elevated temperatures. While not limited to any particular mechanism or action, in some embodiments of the present invention, the surface treatment of the present invention participates in nucleation of a thin, self-protective oxide coating on a treated metal substrate.

Nanomaterial surface treatments provide a new generation of surface properties to both exotic and traditional alloys. Ceria (cerium oxide) was chosen for some embodiments of the present invention. The present invention is not limited to a particular mechanism. Indeed, an understanding of the mechanism is not necessary to practice the present invention. Nonetheless, it is contemplated that oxides of elements that exhibit a reactive element effect (REE), including but not limited to cerium, titanium, lanthanum, and aluminum, silicon, scandium, yttrium, zirconium, niobium, hafnium, tantalum, and thorium plus other rare earth elements, are suitable for use as surface treatment materials in the practice of the present invention.

Many high temperature alloys rely on the formation of protective $Al_2O_3$ and $Cr_2O_3$ scales on their surface to resist damaging oxidation at high temperature (see Stringer, Surface and Coating Technology, 108-109:1 [1989], Hussey et al., Mater. Sci. Engg. A120:147 [1989], Bascail & Larpin, Solid State Ionics 92:243 [1996], Shen et al., J. Mater. Sci 33:5815 [1998]). However, cracking and spallation of the oxide scale can restrict the use of such alloys at high temperatures, particularly under certain isothermal and thermal cycling service conditions. The cracking of the oxide scale and its subsequent spallation may be induced by stresses arising either from the oxide growth process or from the difference in the coefficient of thermal expansion (CTE) between the oxide and the alloy (see Stringer, Mater. Sci. Engg. A120:129 [1989]). The addition of rare earth elements such as Ce, Y, Zr, La or their oxides improve the high temperature resistance to damaging oxidation of the alumina- and chromia-forming alloys due to reactive element effect (REE). While not limiting the present invention to any particular mechanism of action, in some embodiments the REE decreases the oxide scale growth rate and improves resistance to scale spallation by increasing the scale-alloy adhesion.

A significant portion of the rare earth surface treatment work to date is done via physical vapor deposition, chemical vapor deposition, and ion implantation (Chevalier, et al., Prace Komisji Nauk Ceramicznych, Ceramika 61:177 [2000]; Riffard, Applied Surface Sci 199:107 [2002]; He, J. Rare Earths, 19:204 [2001]). Positive results have usually been obtained, but these processes are relatively expensive and often limited to line-of-sight coating on small samples. Sol-gel applications are also utilized for this process (Riffard et al., [2002], supra).

Stringer (1998, supra) discusses performance degradation and/or failure of components in the electric supply industry and the use of coatings to remedy the problems. According to Stringer, damaging oxidation of components has ramifications in at least two situations. Solid particle erosion (SPE) of steam turbine blades occurs in large part due to spalled oxide particles entrained in the steam. For SPE, the most important economic effect is degradation of the turbine, rather than outright failure. Also within the utility industry, because the oxide scale has lower thermal conductivity than the metal, the growth of the corrosion product and oxide scales will result in changes in the temperature distribution. For oxide scale growth on the inner surface of heat exchanger tubes, the effect is to raise the metal mean temperature for a fixed heat flux. This can lead to a creep failure.

Stringer (1998, supra) discusses the use of coatings in the electricity supply industry, including the ability to reduce the loss of components (e.g., through fracture) and to minimize deterioration of performance due to a decreased aerodynamic properties of materials (e.g., through roughening or spalling). A coating's resistance to damaging oxidation at high-temperature often relies on the formation of an alumina layer on the surface of the alloy. Because the melting point of aluminum itself is too low for many utility applications, the aluminum oxide coating must be applied in other fashions. These methods include pack cementation processes, electroplating, electron beam physical vapor deposition, and plasma-spray methods.

Thermal barrier coatings (TBC) are another important class of coatings within the electricity supply industry, generally used in the hot sections of gas turbines. In some embodiments, YSZ (a TBC) is stabilized with nanoparticles such as nanoceria.

Within coal-fired boiler systems, there are two particular issues relating to material surface integrity (Stringer, 1998, supra). The first relates to the transfer of oxide through the water-touched part of the system, causing the dissolution of magnetite in one area and its redeposition elsewhere. The second is the exfoliation (spalling) of oxide and its transport in the steam, causing erosion damage in the steam valves and in the early stage of the high pressure and intermediate pressure steam turbines. In some cases the scale may collect in the bottom of the superheater element, blocking the flow of steam, and leading to overheating and failure.

Ferritic stainless steels are the base material of choice for steam power plant applications because of their overall desirable mechanical properties and relatively low cost. Austentic stainless steels, although more corrosion resistant, have lower thermal conductivity, higher coefficient of thermal expansion, and a higher density, in addition to some difficulty with welding. Nickel-based alloys are often used as an alternative to austenitic stainless steel because they are less susceptible to thermal fatigue.

Experiments conducted during the course of development of the present invention demonstrated reduction of oxide scale on a variety of metal alloys at temperatures up to at least 800° C. Accordingly, in some embodiments, the present invention provides methods of protecting stainless steels and other metal alloys against damaging oxidation.

The invention is not limited by the type of damage that is reduced or prevented by the surface treatment. For example, in some embodiments, metals are treated with the nanoparticle surface treatment to decrease material failures due to stress corrosion cracking The invention is not limited by the nature of the oxidative or corrosive environment in which damage is reduced or prevented by the surface treatment. For example, in some embodiments, metals are treated with the nanoparticle surface treatment and heated in a salt-containing atmosphere. The nanocrystalline treatment provides a self-protective surface that can withstand the fluxing of salts. In yet other embodiments, metals are treated to improve resistance to acidic environments.

I. Protection of Metal Alloys from Damaging Oxidation

As described above, the present invention demonstrated the protection of a variety of metal alloys against damaging oxidation and corrosion, e.g., at high temperatures and/or humidity, via the formation of the self-protective oxide film or coating, e.g., by the use of a surface treatment. The present invention is not limited to a particular surface treatment. Indeed, a variety of materials are contemplated as being useful as surface treatments. In preferred embodiments, surface treatment comprises a nanoparticle surface treatment.

The present invention is not limited to a particular element for use as a surface treatment. In some exemplary embodiments, nanoceria (cerium oxide) is utilized. Other examples include, but are not limited to, titanium, lanthanum, and aluminum, silicon, scandium, yttrium, zirconium, niobium, hafnium, tantalum, and thorium plus other rare earth elements (e.g., oxides of these metals). Surface treatments may be tested using any suitable method including, but not limited to, those described herein.

The present invention is also not limited to the protection of a particular metal. Exemplary embodiments of the present invention utilized various grades of stainless steel. However, the methods of the present invention find use with any metal that is susceptible to damaging oxidation and corrosion under its normal conditions of use (e.g., high temperature; moisture; salt; acid, etc.) including, but not limited to, nickel alloys, aluminum alloys, and super alloys.

The present invention is also not limited to a particular surface treatment technique. In some preferred embodiments, the simple dip method described in the Experimental section below is utilized. In other embodiments, additional surface treatment techniques including, but not limited to, spraying, brushing, spinning, spraying, and electrophoresis. In preferred embodiments, surface treatment methods that reduce nanoparticle agglomeration are utilized.

II. Uses of Treated Materials

As described above, the present invention provides nanoparticle surface treatment for use in preventing the damaging oxidation of metals at high temperature and/or high moisture. The treated materials of the present invention find use in a wide variety of applications. Exemplary applications are discussed above and herein. However, one skilled in the art recognizes that the methods and compositions of the present invention find use in any application where the protection of metals from damaging oxidation is desired.

A. Stainless Steel

For example, in some embodiments, the methods and compositions find use in protecting stainless steel components in the energy industry, including, but not limited to, fossil energy system components, heat exchangers, reheater pipes, solar collectors/panels, refrigeration and heating equipment, vacuum and gas chambers, hydrogen fuel cell components, and flame stabilizers.

In other embodiments, the methods and compositions of the present invention find use in a variety of other industries including, but not limited to, surgical components, fan accessories, inlet-outlet transitions, automobile exhaust systems, aircraft cables and wires, and bearing rods.

In still further embodiments, the methods and compositions of the present invention find use in components of coal fired, steam generating power plants. Driven in part by the U.S. DOE's Vision 21 program, the Kyoto Accord and similar proposals, there is a goal to increase the efficiency of coal-fired power plants towards or even well over 50%. Currently, the net efficiency of modern coal-fired, steam-generating power plants in the U.S. typically is approximately 40%. Ferritic stainless steels are used for many of the components in the plants because of their desirable mechanical properties and relatively low cost. In order to increase the efficiency of the plants, however, the same ferritic steels cannot be used in their current state because they do not exhibit sufficient resistance to damaging oxidation at increased temperatures necessary for increased efficiency.

The use of ferritic stainless steel at elevated temperatures is limited in part by the growth of a heavy oxide scale that can spall during operation and ultimately contribute to component failure. In steam environments, the reduction of the oxide scale growth is critical to improved efficiency. It is preferred to make use of ferritic steels to the maximum possible temperature before switching to higher-temperature alloys" such as nickel-based alloys. Austenitic stainless steels do not possess the ideal mechanical properties.

In some preferred embodiments the surface treatments for use in steam generating applications have anti stick properties. Unlike plasma spray techniques that often require sandblasting to promote adhesion followed by the surface treatment process, which is inherently rough, the nanoparticle surface treatment process leaves a relatively smooth, as-machined surface. The smooth nanocrystalline surface formed by the nanoparticle surface treatment is an aid to reduce sticking relative to some other processes.

B. Heat Treating Equipment

In other embodiments, nanoparticle surface treatments are used as a pre-treatment for stainless steel before heat treating. The traditionally used heat treating process causes the steel to form an oxide layer. If the level of oxidation that occurs during heat treating is too high (e.g., when the oxidation is damaging oxidation), a vacuum process, a nitrogen atmosphere, or stainless steel foil wrap is used. Each of these measures for reducing oxidation adds cost to the process. Consequently, although damaging oxidation is undesirable, it is tolerated because prevention may not justify the additional cost. The present invention provides preventative surface treatments to reduce the level of damaging oxidation without the need to use expensive measures such as vacuum heat treatment and/or post-treatment removal of excessive oxide scale. The present invention provides methods and compositions for simple dip coating treatments (e.g., with preparations of nanoparticles) of components made of steel or other alloys prior to heat treating. The surface treatments of the present invention permit heat treating at atmospheric pressure without risk of damaging oxidation of the treated material.

Figure 27:
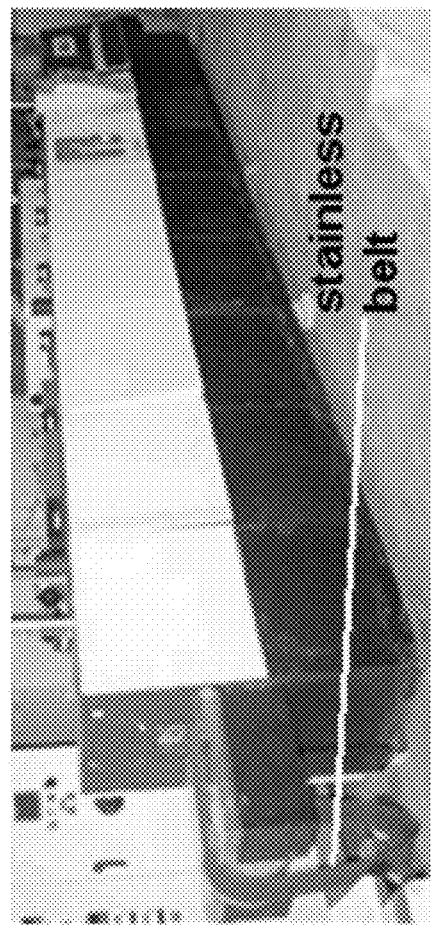
FIGS. 27A and 27B show two examples of continuous belt furnaces having stainless steel belts to transport samples for heat treating.
Figure 27:
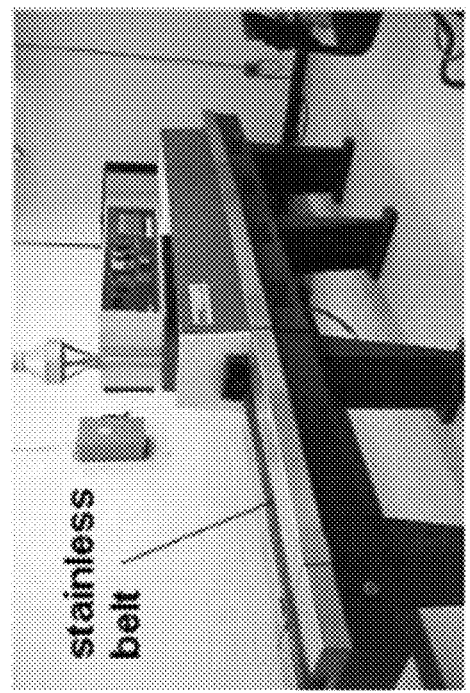

The ability to use the simplified processes of the present invention for reduction of damaging oxidation makes possible applications that would be very difficult or impossible if vacuum heat treatment and/or post-treatment removal of oxide scale were required. In some embodiments, the present invention provides methods of treating and re-treating parts such as machine parts that are exposed to high temperatures while such parts are in use. For example, machine parts such as stainless steel belts and curtains used in continuous heat treating furnaces are continuously exposed to high temperatures. By way of example, but not intending to limit the invention to any particular application or configuration, two examples of continuous belt furnaces are shown in FIG. 27. Although the belts are sometimes replaced due to ultimate alloy failure because of embrittlement, grain growth, stretching, or other reasons, in 10-25% of cases, replacement is due to oxidative loss of belt material. In some embodiments, continual re-application of nanoparticle solutions of the present invention as the belt traverses its path is utilized. In other embodiments, stainless steel curtains used to isolate the atmosphere during heat treating are continuously treated with the nanoparticle solutions of the present invention. Oxidation degradation of the curtains is severe; one surface is continually exposed to the atmosphere while heated. It is contemplated that periodic treating (e.g., spraying) of the curtain with nanoparticles in solution will extend their life and result in cost savings.

Fossil fuel power plants also use a similar type of curtain as a shield. In some applications, this curtain is submersed in water and corrosion of the stainless steel immediately above the water line is a severe, expensive problem. These curtains are approximately 95 ft×45 ft in size and have a cost of approximately $25,000. In some embodiments, nanoparticle surface treatments are used to reduce or prevent this type of corrosion.

In other embodiments, nanoparticle surface treatments are used to prevent metal dusting, a failure due to carburization of furnace components during heat treatment operations.

C. Compositions and Kits

In some embodiments, the present invention provides nanoparticles for use by end users. For example, in some embodiments, nanoparticles and kits containing the nanoparticles are sold for use as a pre-treatment to reduce damaging oxidation of components in a furnace or other heat treatment equipment (see e.g., above section). In some embodiments, the kits comprise instructions for using the nanoparticles for treatment of metal components.

D. Fuel Cells

In yet other embodiments, the present invention provides methods of treating solid oxide fuel cells. Solid oxide fuel cells differ in many respects from other fuel cell technologies. First, they are composed of all-solid-state materials—the anode, cathode and electrolyte are all made from ceramic substances. Second, because of the all-ceramic make-up, the cells can operate at temperatures as high as 1800 degrees F. (1000 degrees C.), significantly hotter than any other major category of fuel cell. At the high operating temperatures, oxygen ions are formed at the "air electrode" (the cathode). When a fuel gas containing hydrogen is passed over the "fuel electrode" (the anode), the oxygen ions migrate through the crystal lattice to oxidize the fuel. Electrons generated at the anode move out through an external circuit, creating electricity. Reforming natural gas or other hydrocarbon fuels to extract the necessary hydrogen can be accomplished using either external or internal fuel reforming.

The fuel-to-electricity efficiencies of solid oxide fuel cells are expected to be around 50 percent. If the hot exhaust of the cells is used in a hybrid combination with gas turbines, the electrical generating efficiency might exceed 70%. In applications designed to capture and utilize the system's waste heat, overall fuel use efficiencies could top 80-85%.

The Department of Energy has formed the Solid State Energy Conversion Alliance (SECA) with a goal of producing a core solid-state fuel cell module that would cost no more than $400 per kilowatt. At this price, fuel cells would compete with gas turbine and diesel generators and likely gain widespread market acceptance.

While much international research is underway directed at fundamental stack development, significant materials challenges exist related to structure, gas manifolds, fuel reforming and, in particular, heat transfer.

Fuel reforming and related reactions frequently take place at temperatures commonly in excess of 900° C., depending on the specific design approach. The environment for materials used in these reformers can be extremely hostile from the perspective of damaging oxidation, and conditions often exist that can lead to carburization of materials, potentially resulting in metal dusting.

In another area of the SOFC system, heat exchangers are nearly always used to maximize system operating efficiencies by transferring heat from the cathode air exiting the fuel cell stack to the fresh air entering the system. An additional heat exchanger is commonly employed on the anode side of the system for fuel preheat, particularly in those systems relying on external steam methane reforming means. These heat exchangers are commonly referred to as the cathode and anode recuperators.

In some embodiments, the present invention provides methods and compositions to protect materials employed in these environments in order to maximize the life of the product, thereby reducing life cycle costs. In some embodiments, zirconium or cerium oxide nanoparticle surface treatments are utilized.

E. Aluminum Alloys

In yet other embodiments, the nanoparticle surface treatments of the present invention are used in the heat treatment of aluminum alloys. One exemplary application of aluminum alloys is in diesel engine components. To meet increasingly stringent emission requirements for diesel engines, some engine manufacturers are investigating the use of recirculation of some portion of exhaust gas back through the charge air cooler as intake air to the engine. The primary goal of this is to reduce $NO_x$ and $SO_2$ emissions (although $SO_2$ emission will also be addressed through the use of low sulfur diesel fuels). This will initially affect large Class 7 and 8 trucks. The purpose of the charge air cooler is to cool the engine intake air from the turbocharger (approximately 200-230° C. at the inlet), in order to increase the engine compression ratio and improve performance and mileage. There is enough moisture in the air that at some point in the charge air cooler that condensation is likely to form.

With the advent of exhaust gas introduction into the charge air cooler, the condensate that will form will be acidic. Currently, the primary material of construction for this heat exchanger is aluminum due to weight, cost and manufacturability. The introduction of an acidic condensate has the detrimental effect of shortening the life of the aluminum charge air cooler through perforation attack of the tube material and attack of the internal fin/braze joint. The failure mode incurred through perforation attack is a gradual loss of engine performance over time. The failure mode of internal fin and braze joint attack is catastrophic failure of the entire charge air cooler due to fatigue failure (because of the internal bond loss).

Accordingly, in some embodiments, the present invention provides methods of protecting aluminum with a self-protective coating generated through using nanoparticle surface treatments. Aluminum alloys have a lower service temperature than the steels and super alloys, but there are aluminum alloys with rare earth additions for the same reasons as for ferrous alloys—a thin, adherent, corrosion-resistant oxide film. Al—Co—Ce (84-7.5-8.5) is a well-known amorphous alloy that forms a 10-50 nm thick high performance corrosion barrier on its surface, due in part to the presence of Ce in the alloy.

Lanthanum and cerium additions are also used very effectively in an improved zinc galvanizing product called GALFAN (developed by ILZRO/Weirton Steel). This is a zinc-5 wt. % aluminum alloy with small rare earth additions that is used as a substitute for 'straight' zinc. It has been shown to be very effective in most galvanized applications with the possible exception of heavily contaminated industrial environments. It is in extensive use in Europe as a galvanizing treatment for sheet steel.

Rare earth additions are also beneficial in magnesium and aluminum-magnesium cast alloys. Once again, the grain structure is refined, the negative impact of intermetallics on notch sensitivity, toughness and strength is offset and corrosion resistance greatly improved. In some cases (e.g., $Al_8Mg_5$), formation of the intermetallic may be suppressed.

Each of these elements finds used in nanoparticle surface treatments of the present invention, particularly as applied to aluminum alloys.

EXPERIMENTAL EXAMPLES

The following examples serve to illustrate certain preferred embodiments and aspects of the present invention and are not to be construed as limiting the scope thereof.

Example 1

Methods

This example describes methods for the generation and testing of coated stainless steels.
Austenitic alloys: 304, 316, 321, Ferritic 430, Martensitic 410, Allegheny 453
Size for surface treatment tests: approximately ⅛ in×½ in×1 in cut from stainless steel stock.
Vendor: Slice of Stainless, 1-800-309-5484.
Commercially Available Nanopowders:

| Material | Vendor | Particle Size |
|---|---|---|
| Ceria | Nanophase Technologies 630-771-6700 Romeoville, IL | 20 nm |
| Ceria | Nanoproducts Corporation 970-535-0629 Longmont, CO | 7 nm |
| Titania | Nanoproducts Corporation | 13 nm |
| $La_2O_3$ | Sigma Aldrich, 800-231-8327 Milwaukee, WI | Not yet released |
| Alumina | Sigma Aldrich | 47 nm |
| Alumina | Nanoproducts Corporation | 4.3 nm |

The size of the nanoparticles is verified prior to surface treatment. Nanoceria are prepared by a microemulsion method as published by Seal (Patil et al., Journal of Nanoparticle Research, v. 4: 433 [2002], incorporated herein by reference in its entirety). The microemulsion system consists of surfactant sodium bis(2-ethylhexyl) sulphosuccinate (AOT), toluene and water. AOT is dissolved in 50 ml of toluene and 2.5 ml of 0.1 mol/lit aqueous cerium nitrate solution is added. The mixture is stirred for 45 min and 5 ml of 1.5 mol/lit ammonium hydroxide aqueous solution is then added dropwise. The reaction is carried out for 1 hr. and then the reaction mixture is allowed to separate into two layers. The upper layer is toluene containing non-agglomerated ceria nanoparticles and the lower layer is aqueous phase. Ceria that is agglomerated to the micron-size range does not provide the initiation for self-protective coatings that nanoparticles provide (as determined by testing on 304L stainless (18-20 Cr, 8-11 Ni)-1000° C.). Agglomerated ceria nanoparticles settle down due to gravity. The toluene sol and the agglomerated ceria particles are extracted. All the chemicals are purchased from Alfa-Aesar Chemical Co.
Prepare steel specimens for surface treatment. Stainless steel is polished (to 1200 grit SiC), cleaned, air dried and pre-oxidized at 973K for 2 minutes in dry air. In some applications, samples are not polished or oxidized.
Methods to disperse purchased nanoparticles into suspension in solution. Parameters for optimization include solvent, pH range, acid or base addition if pH adjustment is necessary, level of impurities, loading of powder in the dispersion, viscosity range, thixotropic properties of solutions, stability, presence of rheology modifiers, and surfactants (e.g., anionic, cationic, or non-ionic).
Sample surface treatment. The steel samples are coated with nanoparticles by dip surface treatment in their respective solutions. Surface treatment is done several times with intermediate drying at 200° C. In some applications, the surface treatment is done one time.
Stainless steels designed for high temperature applications are tested in the same manner as treated specimens.

Example 2

Properties of Treated Samples

Figure 2:
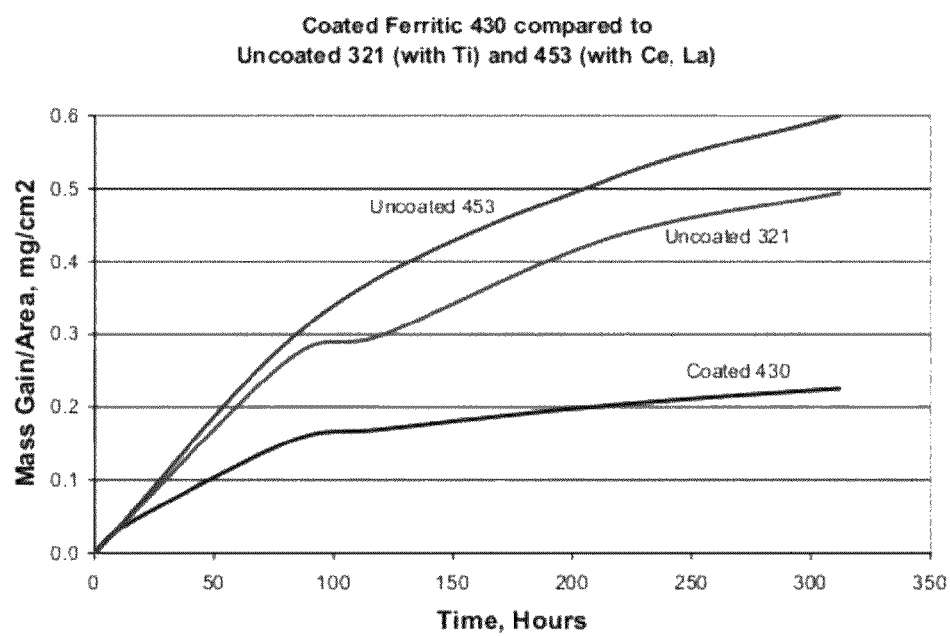
FIG. 2 compares mass gains of nanoceria-coated 430 to uncoated 321 and 453 alloys.
Figure 2:
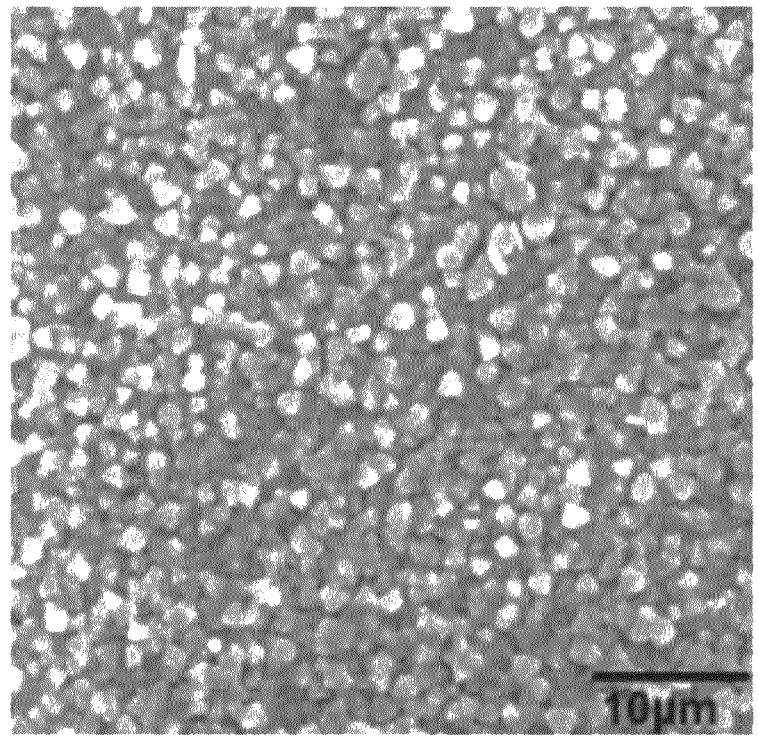
Figure 3:
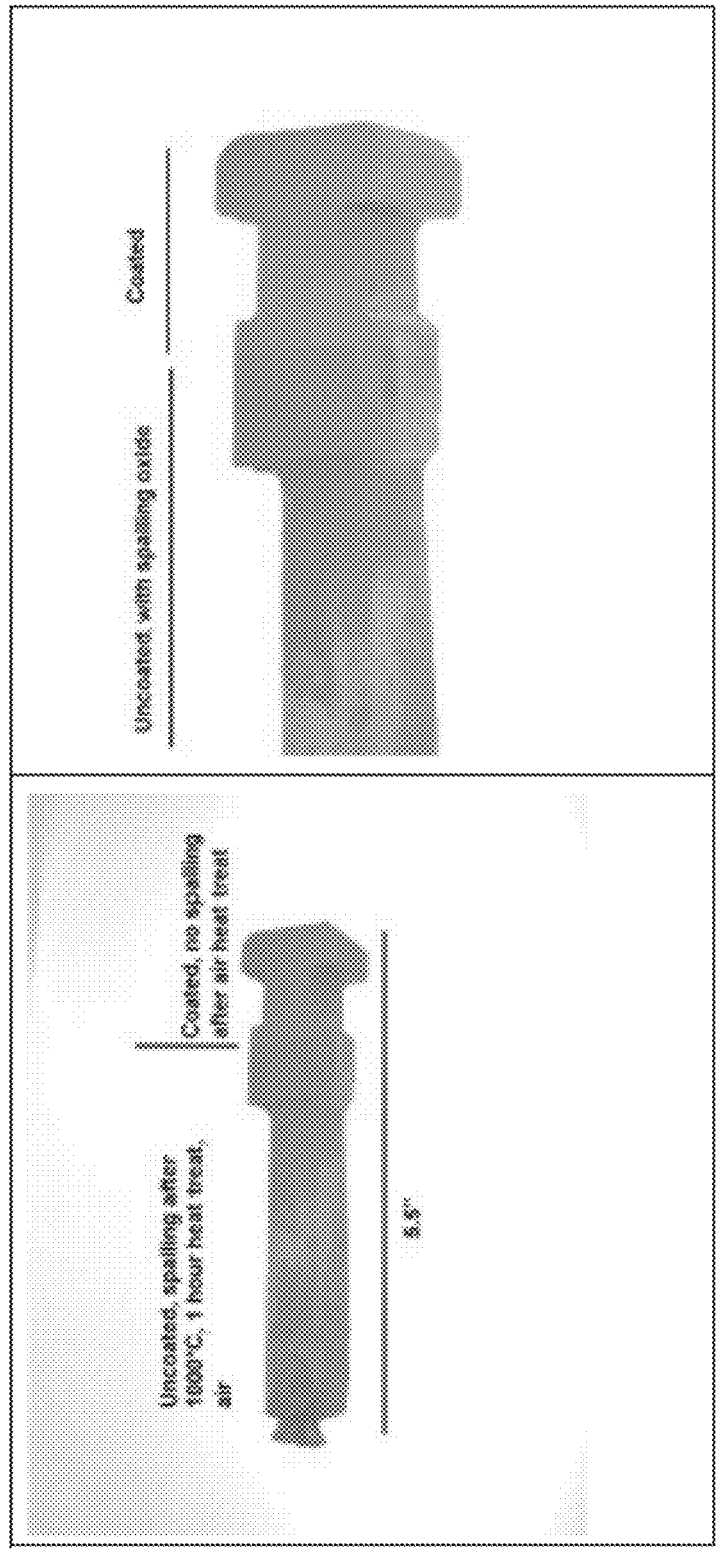
FIG. 3 shows an untreated ("uncoated") 410 stainless steel turbine blade, heat-treated to 1000° C., 1 hour, in air. The end portion, as indicated, was treated ("coated"). Thin oxide formed in the coated zone; spalling oxide formed in uncoated zone.

This Example describes the evaluation of treated stainless steel samples.
A. Austenitic Stainless Steels
The optimum method of specimen preparation for best resistance to damaging oxidation was determined to be to degrease and descale the samples, e.g., through rough grinding.
316 stainless steel was dip coated with nanoceria and heated to 1000° C. for 34 hours. Test conditions: 316 (16-18 Cr, 10-14 Ni, 2-3 Mo)-1000° C. The surfaces are illustrated in FIG. 1. FIG. 1A shows 316 stainless steel; heated in air to 1000° C. for 34 hours. Oxide scale is thick and has spalled. FIG. 1B shows 316 stainless steel coated with nanoceria; heated in air to 1000° C. for 34 hours. A self-protective oxide film has formed that is thin, intact and adherent. Nanoparticle-treated 304 and 316 heated to 800° C. for over 400 hours showed no oxide spalling.
B. Ferritic Stainless Steels
One preferred method of specimen preparation for best resistance to damaging oxidation was determined to be to degrease and descale the samples, e.g., through rough grinding. Test conditions were 430 stainless (16-18 Cr)-800° C. Samples of 430 stainless steel were coated with nanoceria and heated to 800° C. for 400 hours. Although this is a higher temperature than 430 stainless typically sees in service, the purpose of the experiment was to compare oxidation rate of a ferritic stainless to that of 321, an expensive steel with titanium additions often selected for its resistance to damaging oxidation, and to AL453, a specialty Allegheny-Ludlum steel with Ce and La additions specifically added for improved resistance to damaging oxidation due to the reactive element effect (REE).
FIG. 2 compares mass gains of nanoceria-coated 430 to uncoated 321 and to AL453. The mass gain of coated 430 stainless steel is less than that of 321 and AL453. FIG. 2A shows a comparison of low mass gain of nanoceria-coated 430 stainless compared to 321 and AL453 stainless steels, manufactured specifically for oxidation resistance. FIG. 2B shows intact, self-protective oxide coating on 430 stainless after heating to 800° C. in air for 216 hours.
C. Martensitic Stainless Steel
The optimum method of specimen preparation for best oxidation resistance was determined to be to degrease and descale the samples, e.g., through rough grinding.
Test conditions were 410 Stainless (11.5-13.5 Cr)-800° C. 410 stainless steel turbine blades were heated to 800° C. under cyclic conditions even though most commonly turbine blades are exposed to temperatures only on the order of 500-625° C. in service. The results are shown in FIG. 3. The portion of the blade that was coated with nanocrystalline material did not form a spalling oxide. The uncoated portion of the blade exhibited extreme oxide flaking.
D. Corrosion Test Results
Short-term elevated humidity/temperature tests were conducted on a variety of the alloys. Samples of nanocrystalline-coated and uncoated 304, 321 and 430 stainless steels were exposed to 350° C. with 95% humidity for 45 hours. The mass gain data are summarized in Table 1 below.

TABLE 1

| Alloy | Mass gain, kg/m² Nanocrystalline coated | Mass gain, kg/m² Uncoated alloys |
|---|---|---|
| 304 | 0.00000 | 0.00034 |
| 321 | 0.00000 | 0.00046 |
| 430 | 0.00000 | 0.00072 |

For the six samples tested, there was no mass gain on any of the nanocrystalline-coated alloys. All of the uncoated alloys gained mass, with the 430 stainless gaining the most.

E. Lifetime Prediction and Diffusion Studies

Pint, et al (Pint, DOE publication entitled "Defining Failure criteria for extended lifetime metallic coatings, available from the Internet site of DOE, 2002) discusses the use of diffusion studies in defining failure criteria for relatively thick metallic coatings, chiefly aluminide coatings. In that work, the coatings were described as "relatively thin (50-60 μm)." Those CVD coatings were substantially thicker than the nanoparticle surface treatments used in preferred embodiments of the present invention.

Figure 4:
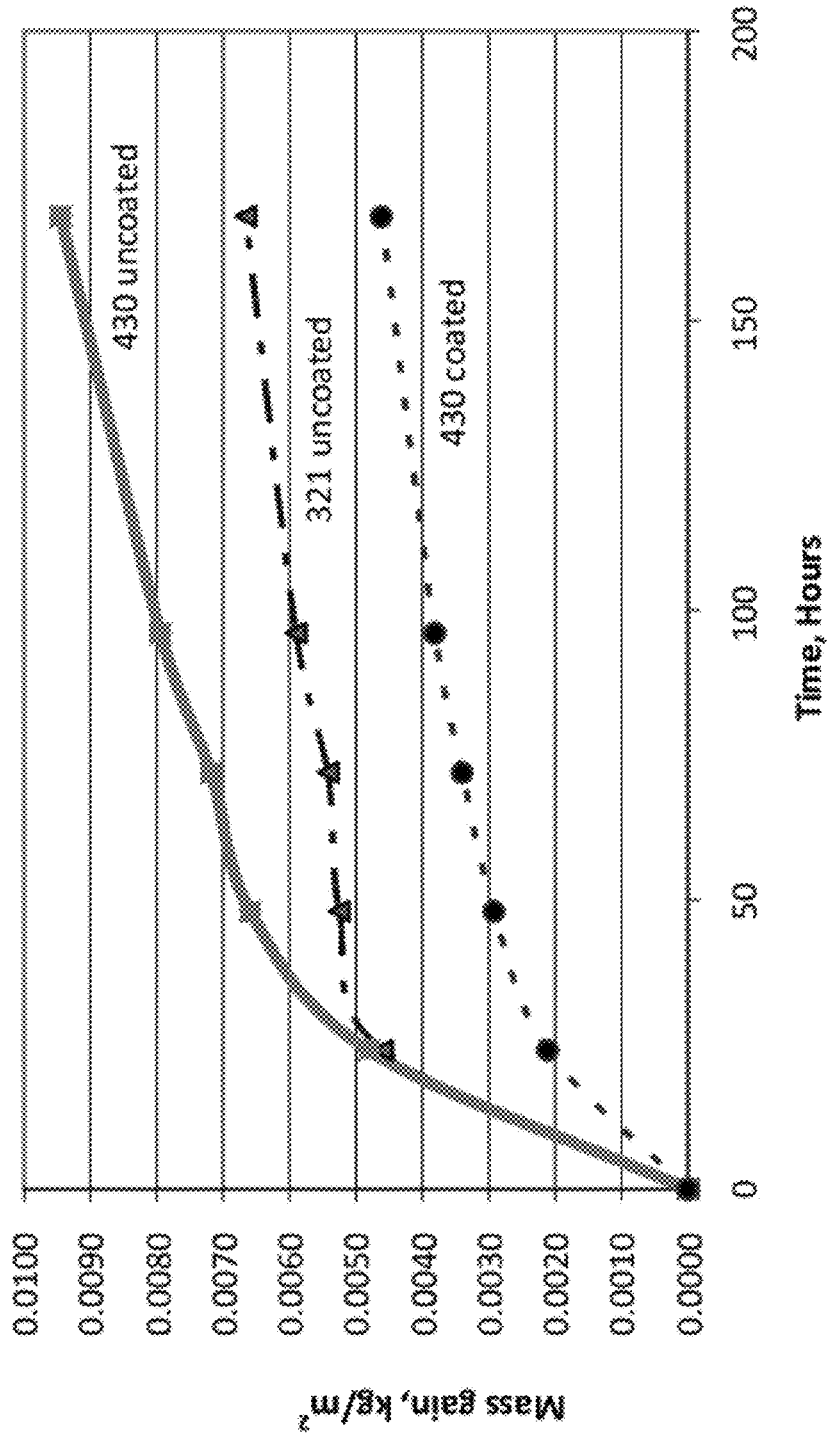
FIG. 4 shows data for 430 stainless exposed to dry air at 800° C.
Figure 5:
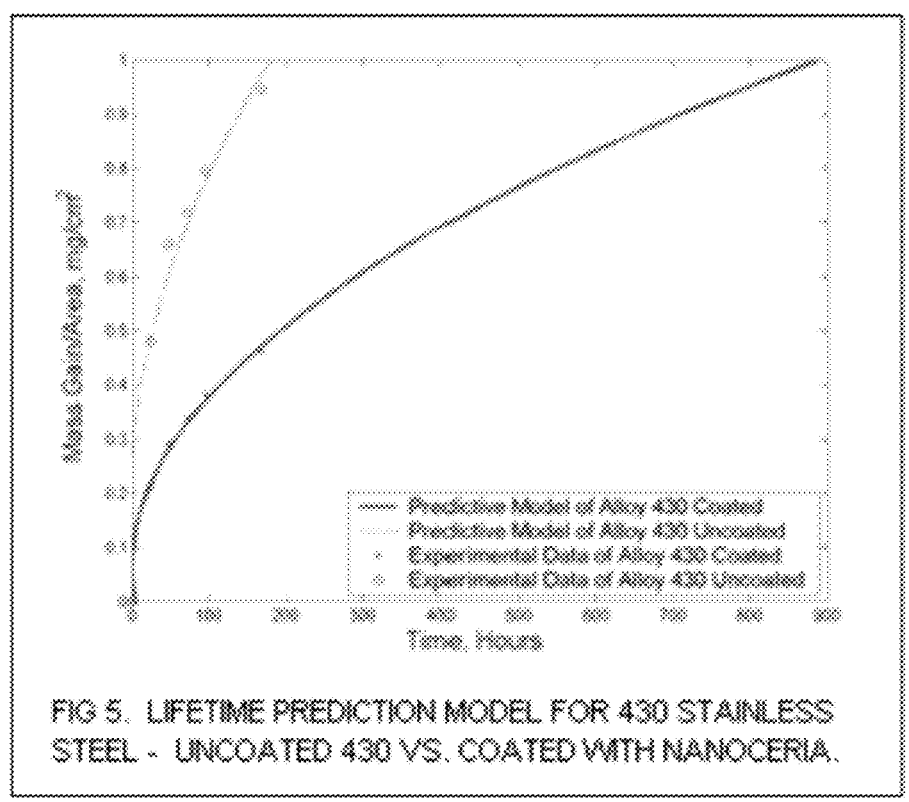
FIG. 5 depicts a comparison of predictive oxidation mass gain per area (95% confidential interval) of alloy 430 exposed to 800° C. with experimental data, both uncoated and coated with nanoceria.
Figure 6:
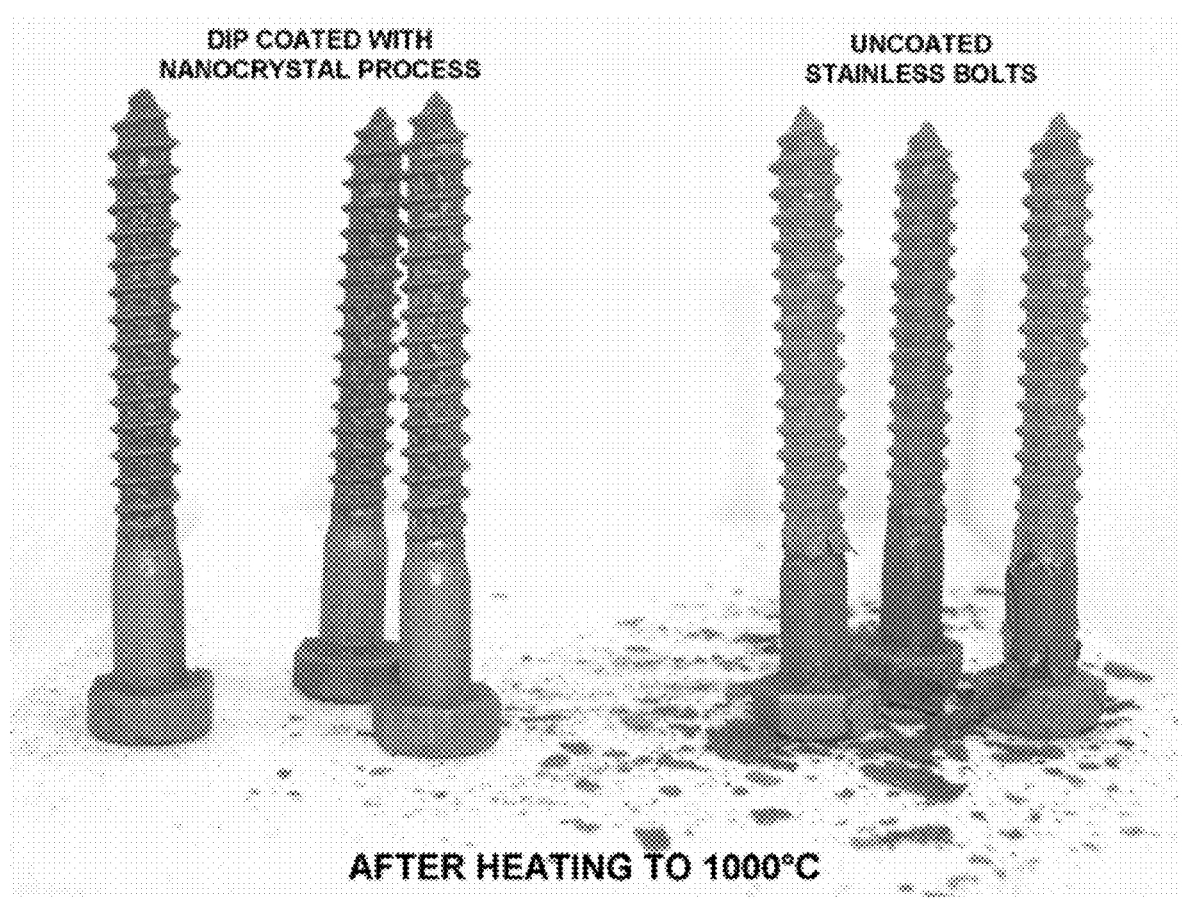
FIG. 6 shows effects of self-protective oxide formed on stainless steel bolts after heating; coated specimens are compared to uncoated specimens.

On the bases of qualitative consideration, rate laws observed in the oxidation of metals and alloys may take various forms. It was determined quantitatively which steps are rate-determining for the oxidation process and relate and explain the experimental results by a generally valid predictive model. In such a situation, one can make assumptions for oxidation processes, where additional phenomena—as for example, nucleus formation, crystal growth, microscopic crystal disturbances, and phase-boundary reactions—can for the most part be neglected. From the data in FIG. 4 for 430 stainless exposed to dry air at 800° C., a parabolic rate law was observed. The parabolic law can be taken to be of the form listed below, which indicates that a diffusion process is rate-determining.

$$\frac{d\xi}{dt} = \frac{k'}{\xi}$$

where $\xi$ is the thickness of the scale, $k'$ the parabolic scaling constant, and t the oxidation time. This model is nonlinear in the unknown parameters. Response Surface Methodology (RSM) is a good option (Draper & Box, Empirical Model Building and Response Surfaces, John Wiley & Sons Inc, [1987]) to fit nonlinear model of the form $$y = f(X, \beta) + \epsilon$$

where: y is an n×1 vector of observations, $f$ is any function of X and $\beta$, X is an n×p matrix of input variables, $\beta$ is a p×1 vector of unknown parameters to be estimated, and $\epsilon$ is an n×1 vector of random disturbances. RSM is an empirical modeling approach using polynomials as local approximations to the true input/output relationship. This empirical approach is often adequate for process improvement in an industrial setting. RSM requires iterative methods that start with an initial guess of the unknown parameters. Each iteration alters the current guess until the algorithm converges. FIG. 5 depicts comparison of predictive oxidation mass gain per area (95% confidential interval) of alloy 430 exposed to 800° C. with experimental data, both uncoated and coated with nanoceria. There is a good match between the experimental data and the predictive model, within the 95% confidence.

One model for describing the oxidation damage is the Wiener process with linear drift. Assuming the oxidation process is normally distributed, the damage measure Z(t) can therefore be captured by the following model:

$$Z(t) = \begin{cases} x_0 + W(t - t_0), & t > t_0 \\ x_0, & t \le t_0 \end{cases}$$

Where $t_0$ represents the start of the damage process, and $x_0$ the initial damage at time $t_0$. W(t) is a homogeneous Wiener process with drift, i.e., $W(t) = \sigma Y(t) + \mu t$, with Y(t) denoting the high standard Wiener process.

The parameters $\mu$ and $\sigma^2$ describe intensity and variance of the damage process. The increments W(t)−W(s) are completely independent and Gaussian distributed with $E(W(t) - W(s)) = \mu(t-s)$, $\text{Var}(W(t) - W(s)) = \sigma^2(t-s)$.

The lifetime, resulting for this damage process, is the period starting from $t_0$ up to the time when Z(t) exceeds a limit level h. If the damage reserve is $y = h - x_0$, then the lifetime $T_y$ is given by $T_y = \inf\{t : W(t - t_0) > y\}$. The density function of $T_y$ is given by $$f_{T_y(t)}(t) = \frac{y}{\sqrt{2\pi \sigma^2 (t - t_0)^3}} \exp\left(-\frac{(y - \mu(t - t_0))^2}{2\sigma^2 (t - t_0)}\right)$$

Using the predictive model data summarized in the equations above and plotted in FIG. 5 (for ferritic 430 stainless steel), the lifetime of nanoceria coated stainless is significantly greater than the uncoated material at high temperatures (800° C.) in an oxidating atmosphere.

Example 3

Steam Testing

Experiments are conducted to evaluate treated samples exposed to steam conditions.

A. Sulfate-Ash Testing

Samples are tested in a sulfate-containing coal ash environment at 650° C. for 200 hours. Tests in molten alkali-containing salts are also conducted.

B. Additional Testing

Nanoparticle surface treatments are deposited on a variety of stainless steel alloys. At least one of the surface treatments is nanoceria. Ferritic Alloys. The ferritic alloys are 430 (16-18 Cr) and 409 (10-11 Cr). For comparison, martensitic 410 (11.5-13.5 Cr) alloys are also included. Austentic Alloys. 304 and 316, along with 321 alloys are utilized. Nickel Alloys. The nickel alloys included are Inconel 625 (58 Ni, 14-17 Cr, 8-10 Mo, 3-4 Nb/Ta) and alloy 200/201 (99-100 Ni). Inconel 625 is rated as having good to excellent resistance to damaging oxidation above 1000° F. (540° C.); Alloy 201 as unacceptable resistance to damaging oxidation at the same temperatures.

The microemulsion system consists of surfactant sodium bis(2-ethylhexyl)sulphosuccinate (AOT), toluene and water. AOT is dissolved in 50 ml of toluene and 2.5 ml of 0.1 mol/lit aqueous cerium nitrate solution was added. The mixture is stirred for 45 min. and 5 ml of 1.5 mol/lit hydrogen peroxide solution is then added dropwise. The reaction is carried out for 1 hr. and then the reaction mixture is allowed to separate into two layers. The upper layer is toluene containing non-agglomerated ceria nanoparticles and the lower layer is aqueous phase. Agglomerated ceria nanoparticles settle down due to gravity. The toluene sol and the agglomerated ceria particles were extracted. All the chemicals can be purchased from Sigma-Aldrich.

Steam testing is done in a laboratory oven equipped with a retort capable of steam experiments at high temperature. The effect of chromium content on scale growth is studied through measuring mass gain as a function of time, temperature, and steam exposure. Cross-sections of the samples are prepared and investigated.

The resistance to damaging oxidation of the self-protective surfaces generated after treatment with different nanoparticle surface treatments is compared to the resistance observed with nanoceria surface treatments. Corrosion testing is conducted.

Example 4

Manufacture of Coated Metals

This Example describes exemplary methods for the production of nanocrystalline coated (nanoparticle treated) metals and their analysis.

Nanoceria particles were produced as follows:
  a. In a dry 250 ml beaker, 50 ml toluene and 0.5 gm Dioctyl sulfosuccinate sodium salt (abbreviated AOT), and a surfactant were combined and stirred with a magnetic stirrer.
  b. 2.5 ml water and 0.1085 gms cerium (III) nitrate hexahydrate were combined.
  c. The water solution was added to the toluene solution and stirred for 1 hour.
  d. 5 ml of 30% hydrogen peroxide was added dropwise and the solution was stirred for 2 hours.
  e. The solution was allowed to separate overnight. The top layer contained nanoceria in toluene. The bottom layer, to be discarded, contained larger ceria in aqueous solution.

The ceria solution, as manufactured, is a fairly bright yellow color. On holding, it fades somewhat. During this fading period, the material converts from a hydrated $CeO_2 \cdot xH_2O$ to an anhydrous $CeO_2$ and the particle size continues to decrease as the larger hydrated complexes continue to break down in size. Nanoparticles in suspension are too small to see. The particle size of the faded yellow solution was measured via a light scattering technique using a Malvern Instruments Zetasizer Nano ZS. This type of system measures "effective particle size"—i.e. the size of the agglomeration. The system cannot detect if the agglomeration is really smaller fine particles.

$CeO_2$ was purchased from Sigma-Aldrich Chemical. The nominal particle size according to the catalog was 10-20 nm. High resolution TEM was conducted on the particles; the particle size was generally less than 10 nm, but there was considerable agglomeration. Measurements with the Malvern Instruments optical system yielded effective average particle size of 14.6 nm, with additional agglomerated sizes of several hundred nanometers.

Several types of stainless steel alloys were included in this study (Table 2).

TABLE 2

Alloys included in this study

| | Composition | Applications |
|---|---|---|
| 304L | Austenitic 18-20 Cr, 8-12 Ni, 2 Mn, 1 Si | General purpose corrosion resistance; used where field welding is employed |
| 316 | Austenitic 16-18 Cr, 10-14 Ni, 2 Mn, 1 Si, 2-3 Mo | Improved corrosion and heat resistance; may be susceptible to stress-corrosion cracking. |
| 321 | Austenitic 17-19 Cr, 9-12 Ni, 2 Mn, 1 Si, 0.5 Ti | Titanium stabilized; excellent for high temperature service in carbide precipitation range. Used in exhaust manifolds, heat exchanger tubes. Good to excellent resistance to damaging oxidation. |
| 410 | Martensitic 11.5-13.5 Cr, 1 Mn, 1 Si | Good strength, hardness & wear resistance. Often used in cutlery applications. |
| 430 | Ferritic 16-18 Cr, 1 Mn, 1 Si | Corrosion resistant/heat resistant/chloride SCC resistant. Heat exchanger applications in petroleum & chemical processing applications. |
| 453 | Ferritic 22 Cr, 0.3 Si, 0.02 Ti, 0.6 Al, 0.10 (Ce + La) | Designed for use in high temperature, oxidative environments. |

Several types of nanoparticles were purchased for a comparison to laboratory manufactured nanoceria. These are summarized in Table 3.

TABLE 3

Nanoparticles

| Particle Composition | Delivered particle form | Nominal Size, Nm | Measured Size (a measurement of effective size due to agglomeration) |
|---|---|---|---|
| $CeO_2$ | Manufactured at Material Interface, Inc. | 3-5 nm | 3.45 nm |
| $CeO_2$ | Aqueous solution | <20 nm | 97% = 14.6 nm  3% = 329 nm |
| $Al_2O_3$ | 5% Aqueous solution | <20 nm | 20.8 nm |
| $SiO_2$ doped With $Al_2O_3$ | Aqueous solution | <20 nm | Bimodal distribution with maxima at 12 nm and 2000 nm |
| $ZrO_2$ | Aqueous solution | <20 nm | 2.7 nm |
| $SiO_2$ | Dry powder | 10 nm | 524 nm |
| $SiO_2$ | Dry powder | 15 nm | 866 nm |
| $TiO_2$ | Dry powder | 5-10 nm | 2198 nm |
| Au | Solution | 3.5-6.5 nm | Assumed 3-7 nm |

The particles that were received as dry powder were ultrasonically mixed with water in dilute solutions before size measurements, but significant reduction in effective particle sizes were not noted. The particles with the smallest measured size were those delivered as aqueous dispersions.

Experiments were conducted comparing the level of self-protection for laboratory-manufactured nanoceria surface treatments to other purchased nanoparticles. For the following sets of data, the substrates were mill finished, and descaled and pickled with commercially available citric acid solution.

Figure 7:
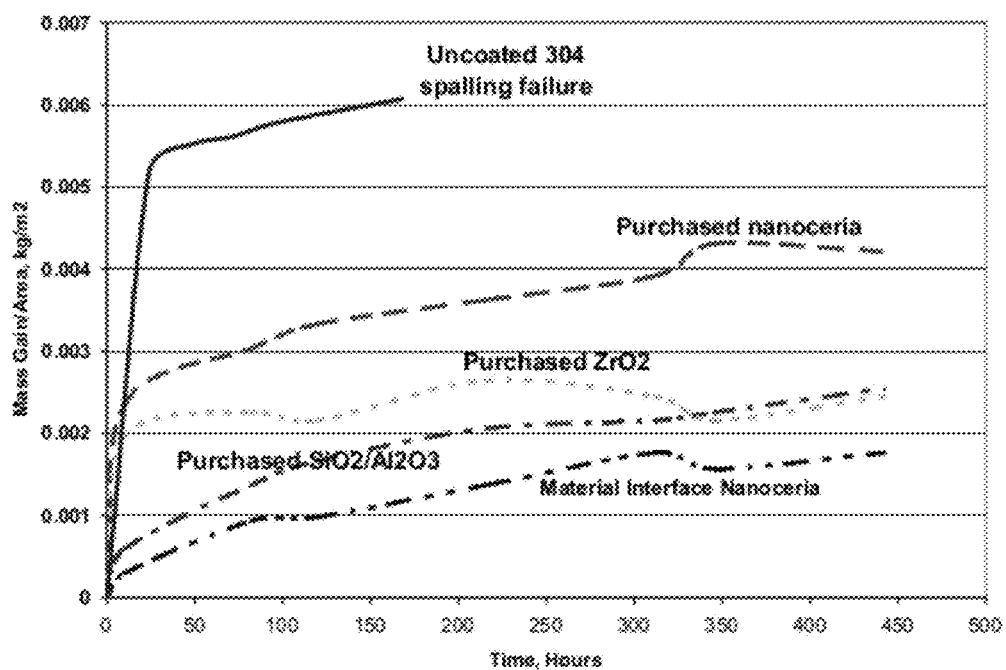
FIG. 7 shows mass gain as a function of area for 304L stainless steel.

Results for 304L stainless steel are shown in FIG. 7. FIG. 7 shows that for 304L, all of the nanomaterial surface treatments eliminated the spalling failure noted at 168 hours in dry air at 800° C. The most improvement was noted for the laboratory-manufactured nanoceria. At 168 hours, Material Interface-manufactured nanoceria reduced the damaging oxide scale mass growth by 80%.

Figure 8:
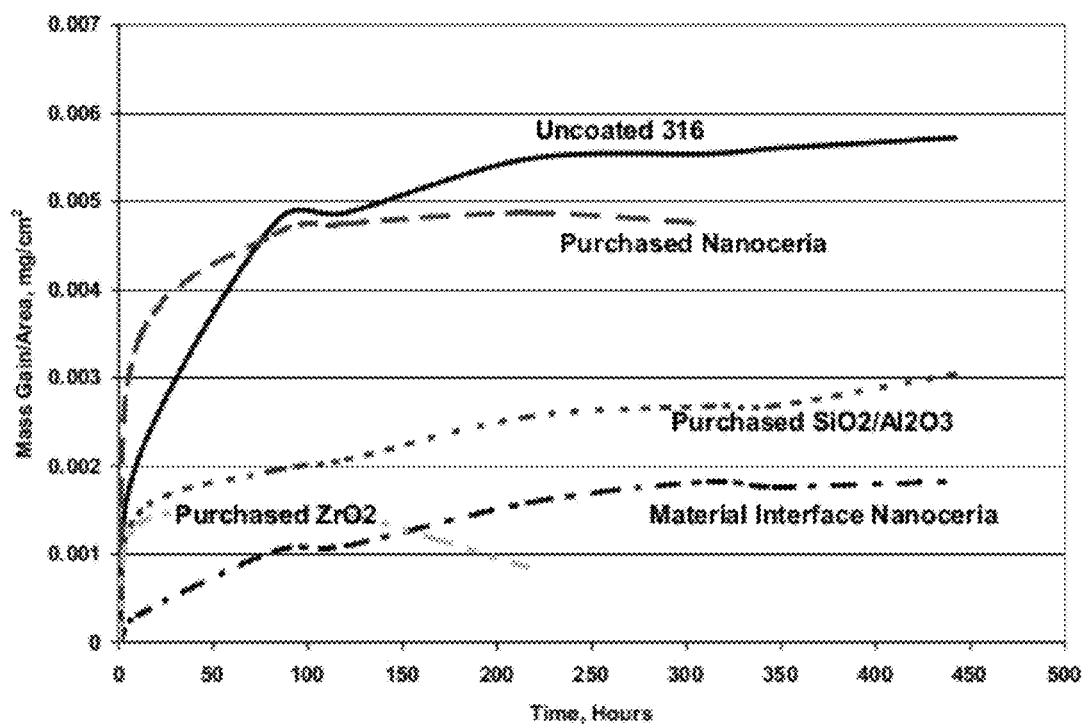
FIG. 8 shows mass gain as a function of area for 316 stainless steel.

Results for 316 stainless steel are shown in FIG. 8. FIG. 8 shows that all of the nanomaterial surface treatments improved the resistance to damaging oxidation in dry air at 800° C. The most improvement was noted for the laboratory-manufactured nanoceria. At 442 hours, Material Interface-manufactured nanoceria reduced the oxidation scale mass growth by 68%.

Figure 9:
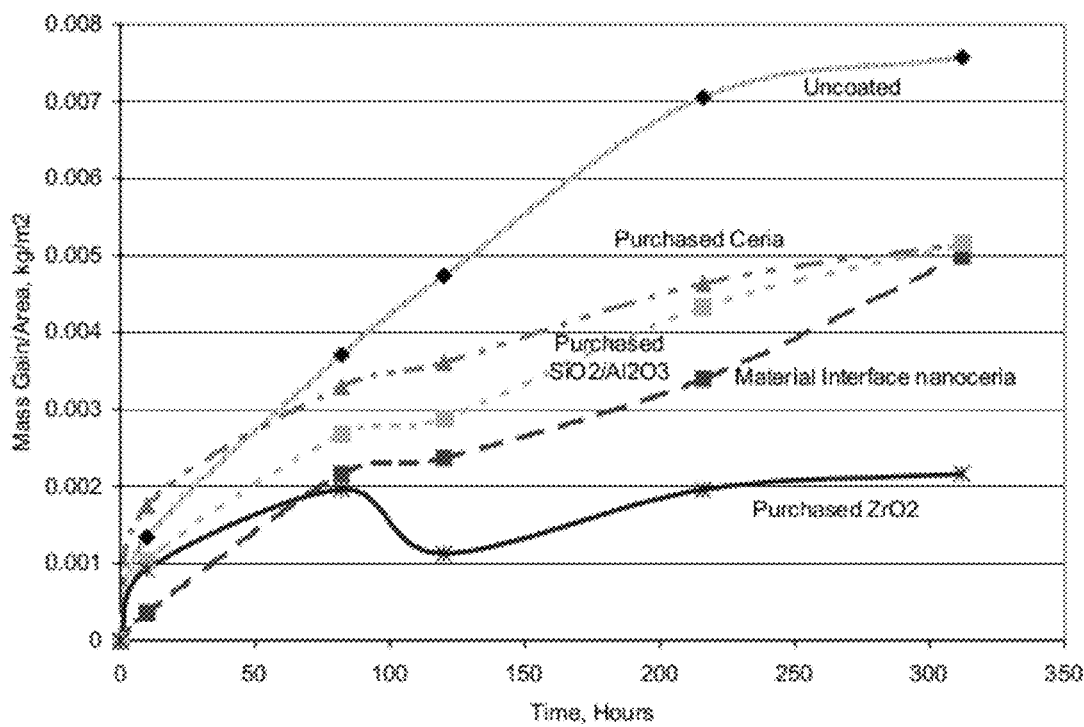
FIG. 9 shows mass gain as a function of area for 321 stainless steel.

Results for 321 stainless steel are shown in FIG. 9. FIG. 9 shows that all of the nanomaterial surface treatments improved the resistance to damaging oxidation in dry air at 800° C. at short times. The untreated sample was showing signs of leveling, however, while the nanocrystalline treated samples were still increasing in mass. The highest performing nanoparticle for surface treatment was purchased nanozirconia.

Figure 10:
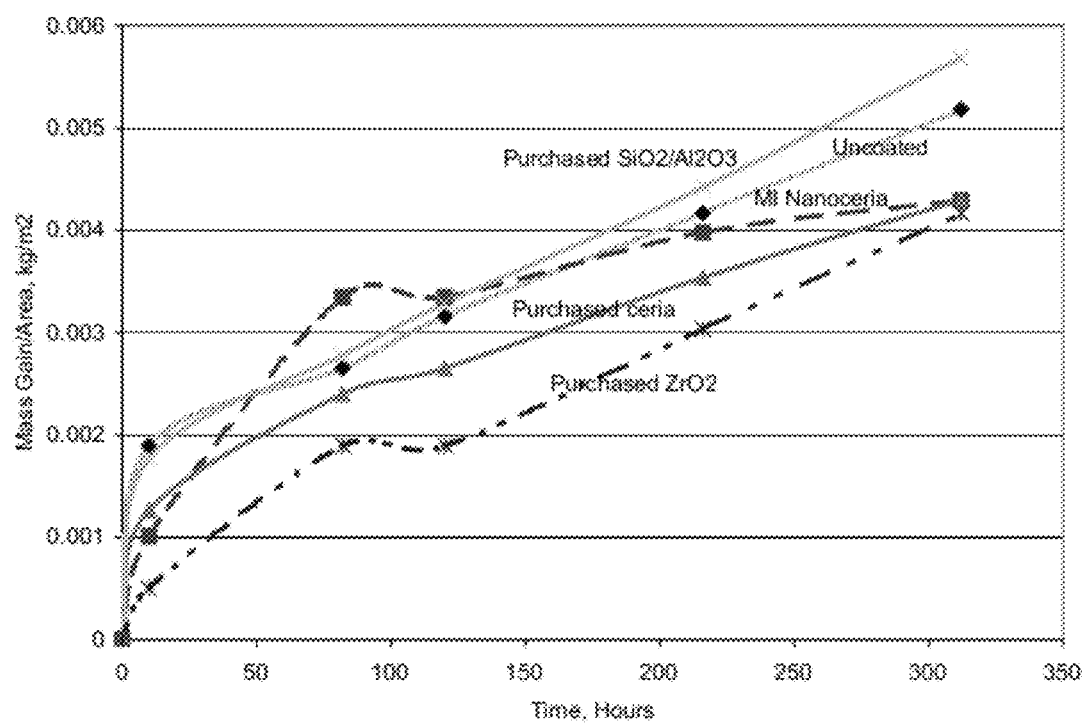
FIG. 10 plots mass gain as a function of area for the 410 stainless steel samples.

FIG. 10 plots mass gain as a function of area for the 410 stainless steel samples at 800° C. for 312 Hours. Purchased zirconia had the lowest initiation rate at low times. Material Interface manufactured nanoceria showed signs of a leveling off with a decreased oxidation rate and a protective oxide formation. This alloy has the lowest level of chromium of all of the alloys in this study.

Figure 11:
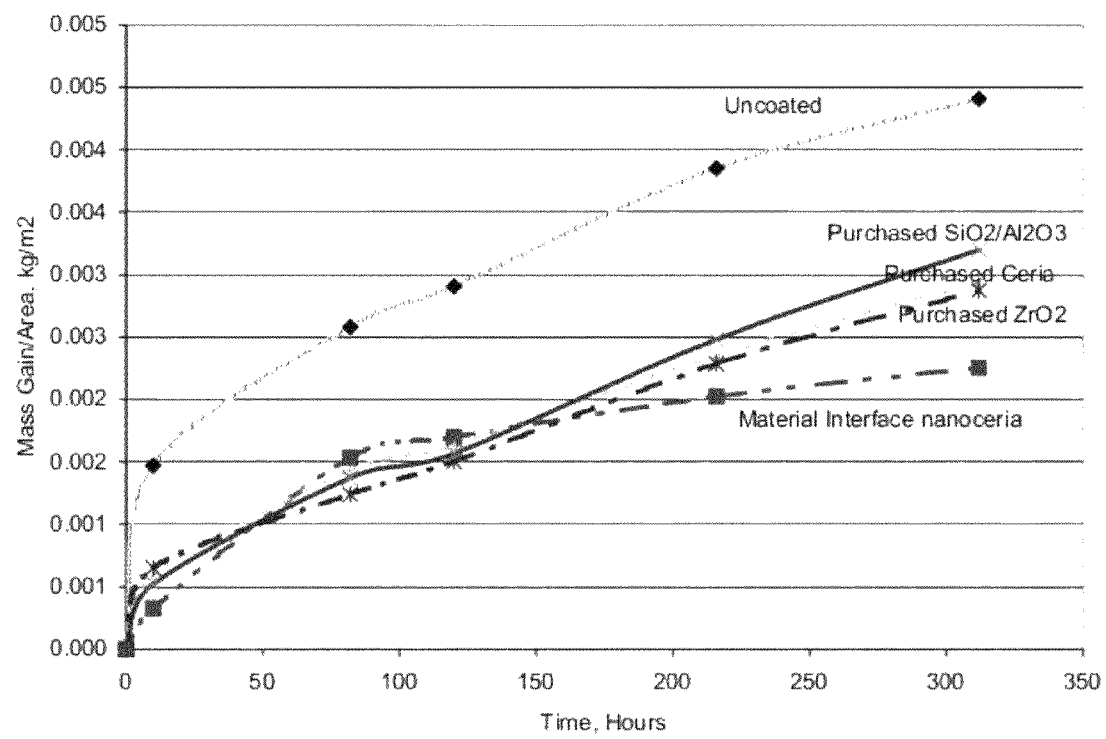
FIG. 11 shows mass gain as a function of area for 430 stainless steel.

Results for 430 stainless steel are shown in FIG. 11. All of the nanomaterials improved the oxidation mass gain of 430 stainless. Material Interface nanoceria had the greatest reduction of the overall oxidation rate.

In the previous data, purchased $ZrO_2$ performed well as a damaging oxidation-resistant nanoparticle surface treatment. The particles were purchased as a 10% solution from Sigma-Aldrich. Variable concentration solutions were manufactured and the effect of concentration on protection was determined. For both 321 and 410 stainless steels, the lowest concentration of $ZrO_2$, 0.05% afforded the most protection. For all of the concentrations, the steel substrates were mill finished, citric acid descaled, and coated with $ZrO_2$ solutions via hand dipping for 10 dips, with air drying between dipping.

Figure 12:
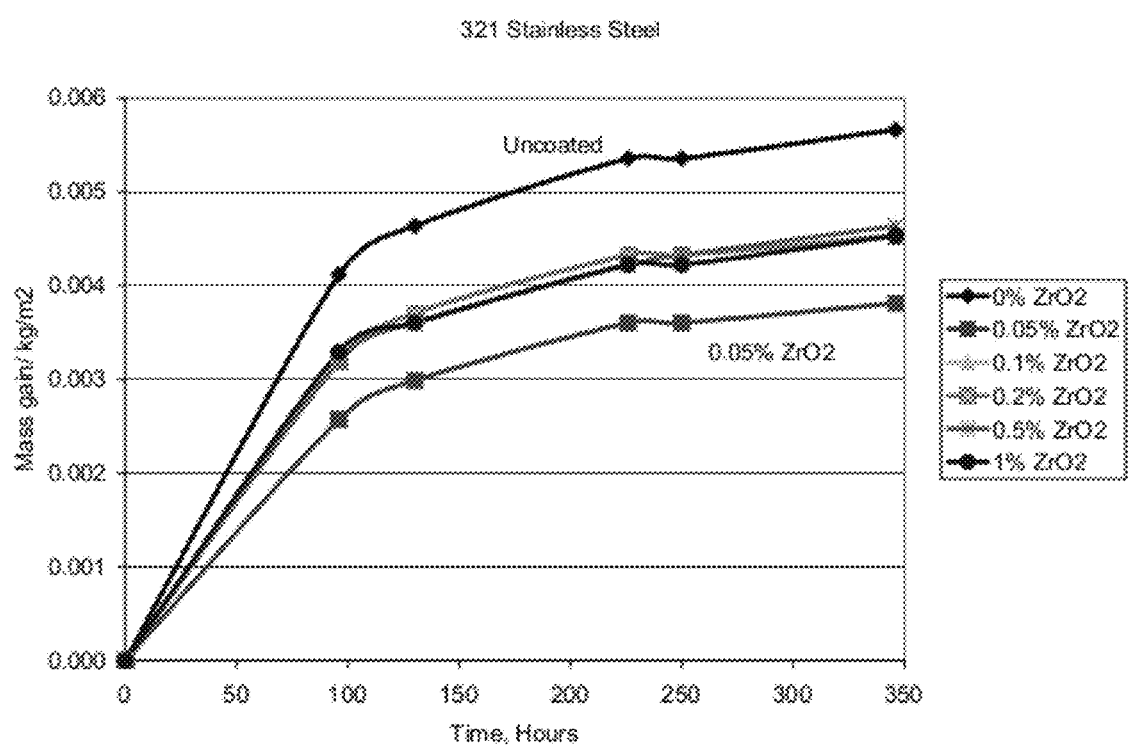
FIG. 12 shows the effect of nano zirconia concentration on protection from damaging oxidation of 321.
Figure 13:
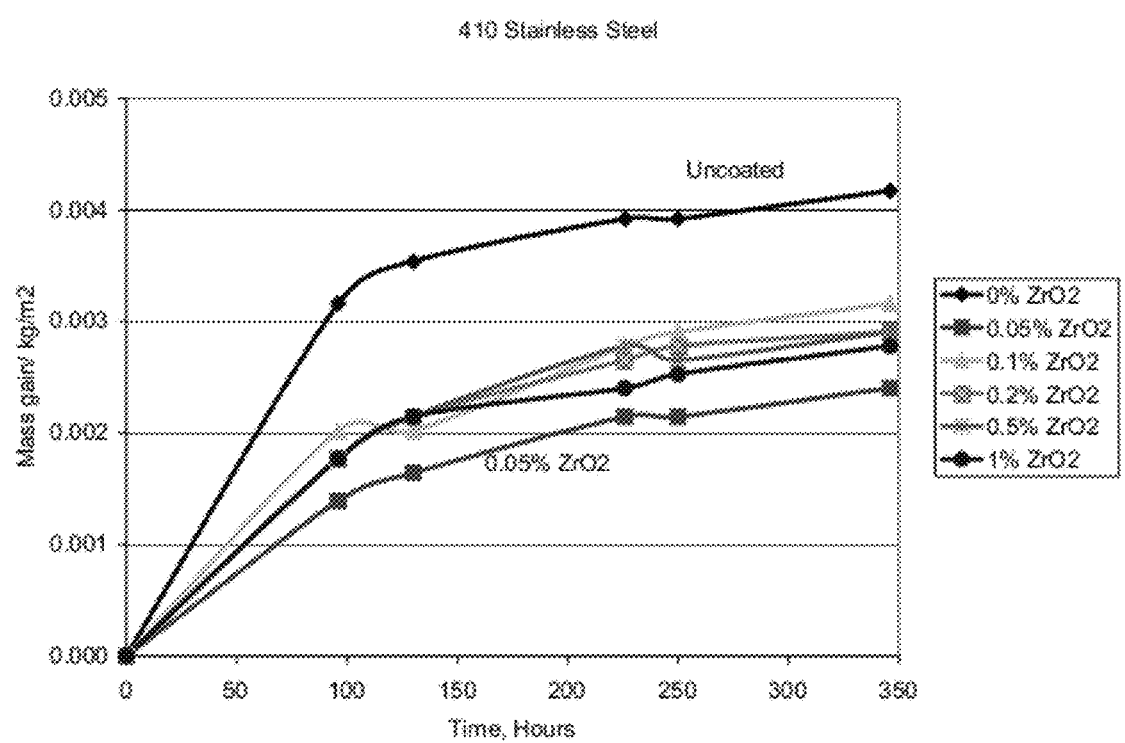
FIG. 13 shows the effect of nano zirconia concentration on protection from damaging oxidation of 410.

FIG. 12 shows the effect of nano zirconia concentration on protection from damaging oxidation of 321. The lowest concentration of zirconia (0.05%) afforded the best protection. FIG. 13 shows the effect of nano zirconia concentration on protection from damaging oxidation of 410. The lowest concentration of zirconia (0.05%) afforded the best protection.

Figure 14:
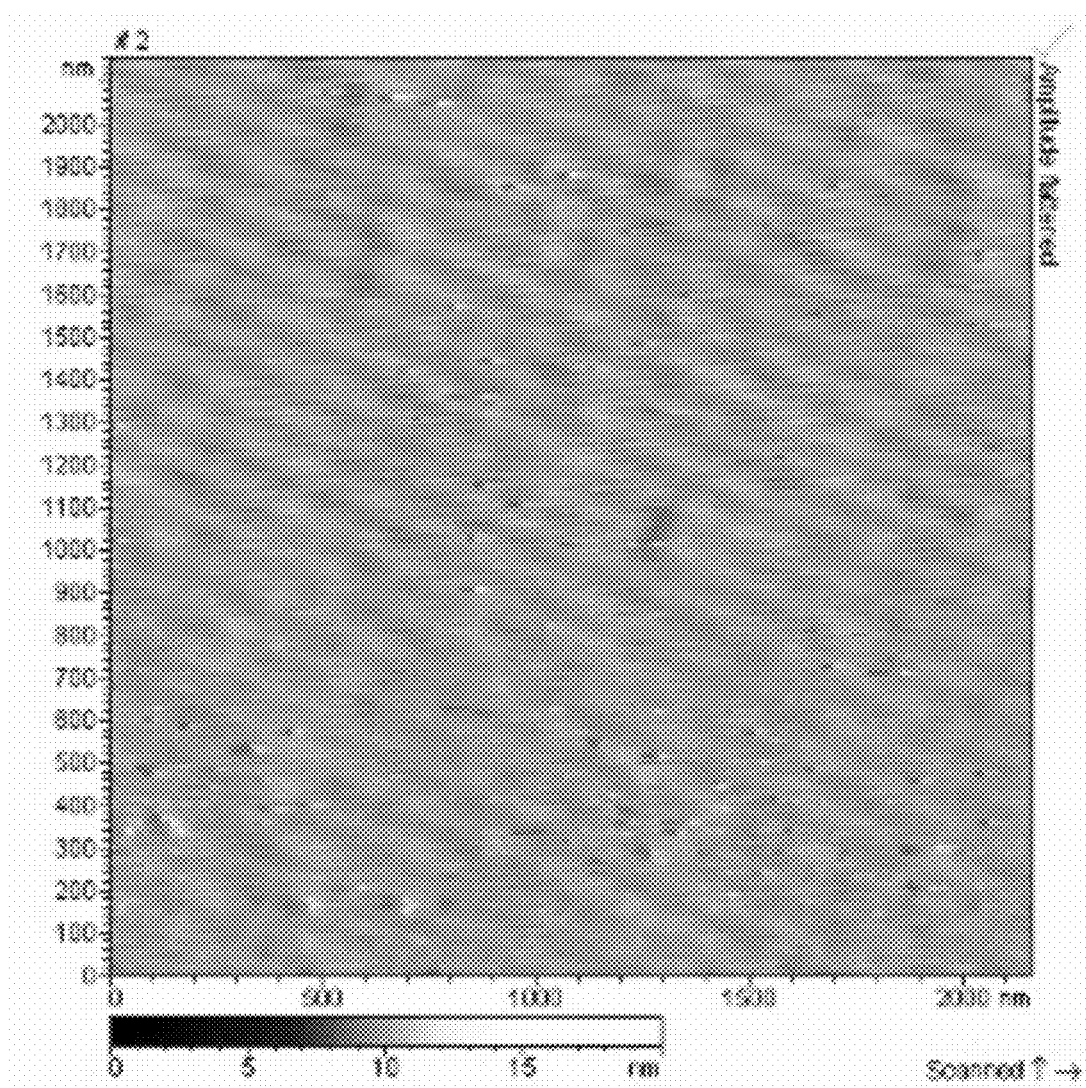
FIG. 14 shows an AFM image of nanoceria on a polished 316 stainless substrate. A broad dispersion of fine nanoparticles is noted.

The concentration of nanoceria in toluene is low—on the order of millimolar. Drops of dried nanoceria-bearing toluene solution onto solid substrates, analyzed with SEM/EDS, do not detect any ceria. An AFM image of nanoceria on a polished 316 stainless substrate showed a low concentration of particles on the surface (FIG. 14).

In bulk 316L stainless steel used for stainless steel tubing in the pharmaceutical industry, the Cr/Fe ratio is approximately 0.23-0.25. With proper passivation treatments, the Cr/Fe ratio at the surface can routinely reach the values 1.5-2.0 suggested by the semiconductor industry. There are several ways to attain this ratio—either through chemical or electrolytic methods. The most widespread method uses chemical passivation with either nitric acid or citric acid baths. The nitric acid method had been prevalent until recently; it is being phased out and replaced with citric acid passivation due to environmental and handling concerns.

A surface that is more Cr-rich, and has less iron at the surface is generally thought to be more resistant to damaging oxidation as well as more resistant to corrosion. Early testing indicated, overall, polished samples had higher mass gains (after REE nanoparticle surface treatment & heating) than did unpolished samples that were passivated according to standard procedures with either nitric acid or citric acid, followed by REE particle surface treatment. This is a desirable result, given the fact most industrial samples are not polished, but rather have a machined finish with some inherent roughness. The roughness likely increases the adhesion of the solution.

Figure 15:
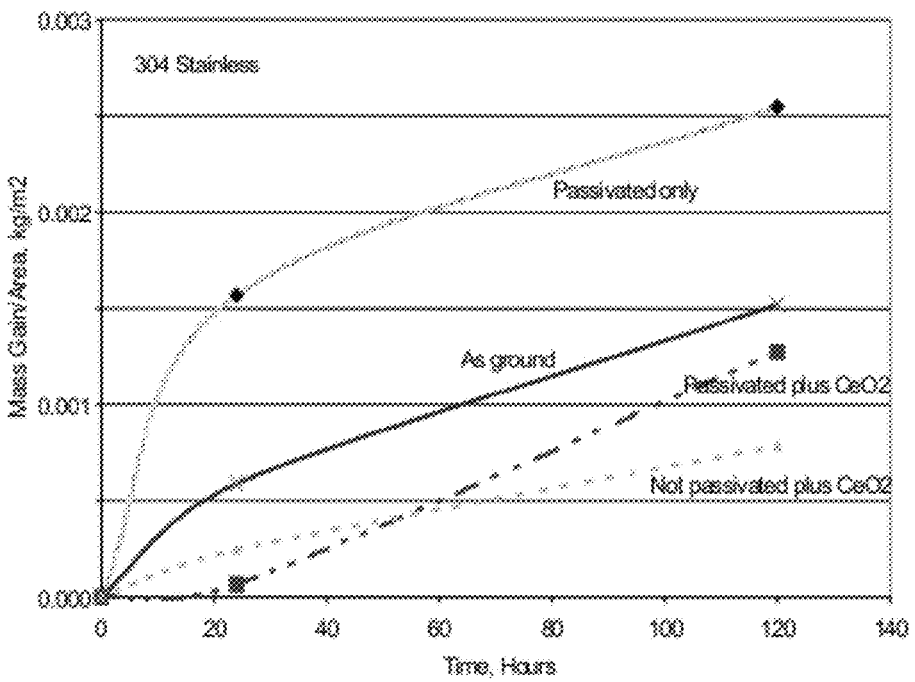
FIG. 15 shows resistance to damaging oxidation as a function of passivation and surface treatments at 800° C.
Figure 15:
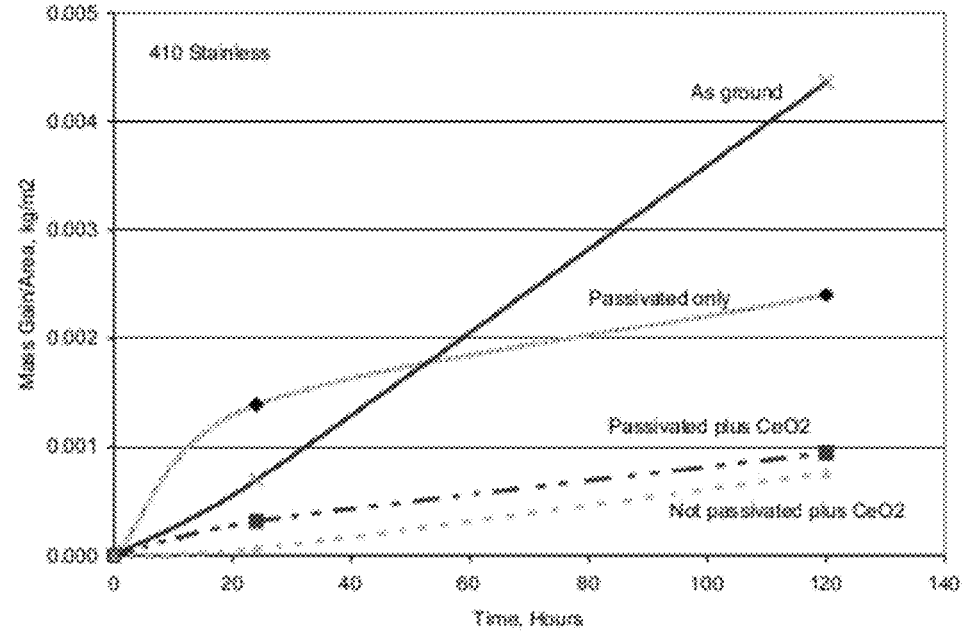

Most of the data presented in the previous sections above were obtained from stainless steel coupons that contained a mill finish and a citric acid descaling, which also passivates the sample. The citric acid solution used was a commercially available mixture called Citrisurf 2250 available from Stellar Solutions in Algonquin, Ill. In some embodiments, passivation is not used. In some embodiments, the passivation process hinders the desirable surface reactions between the reactive elements and the base material from occurring. Using SEM/EDS analysis, the Cr/Fe ratio was higher on coated and passivated samples after being exposed to oxidizing conditions, but the mass gain was also higher. When the samples were not passivated, but merely coarsely polished (400 grit), the Cr/Fe ratio was slightly lower, but the mass gain was also lower and the growing self protective oxide film more intact, and the resistance to damaging oxidation was better. Results are shown in FIG. 15, which shows resistance to damaging oxidation as a function of passivation and surface treatments at 800° C. Not passivated plus CeO2 had the lowest slope.

Figure 16:
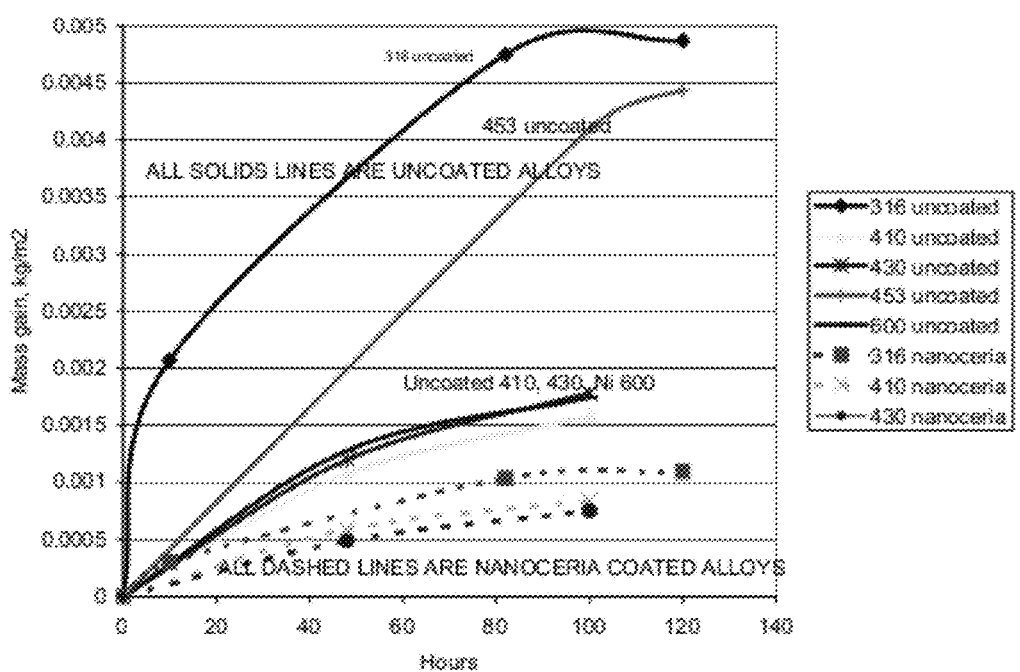
FIG. 16 shows a comparison of the resistance to damaging oxidation of coated stainless steels to stainless steels designed for high temperature applications.
Figure 17:
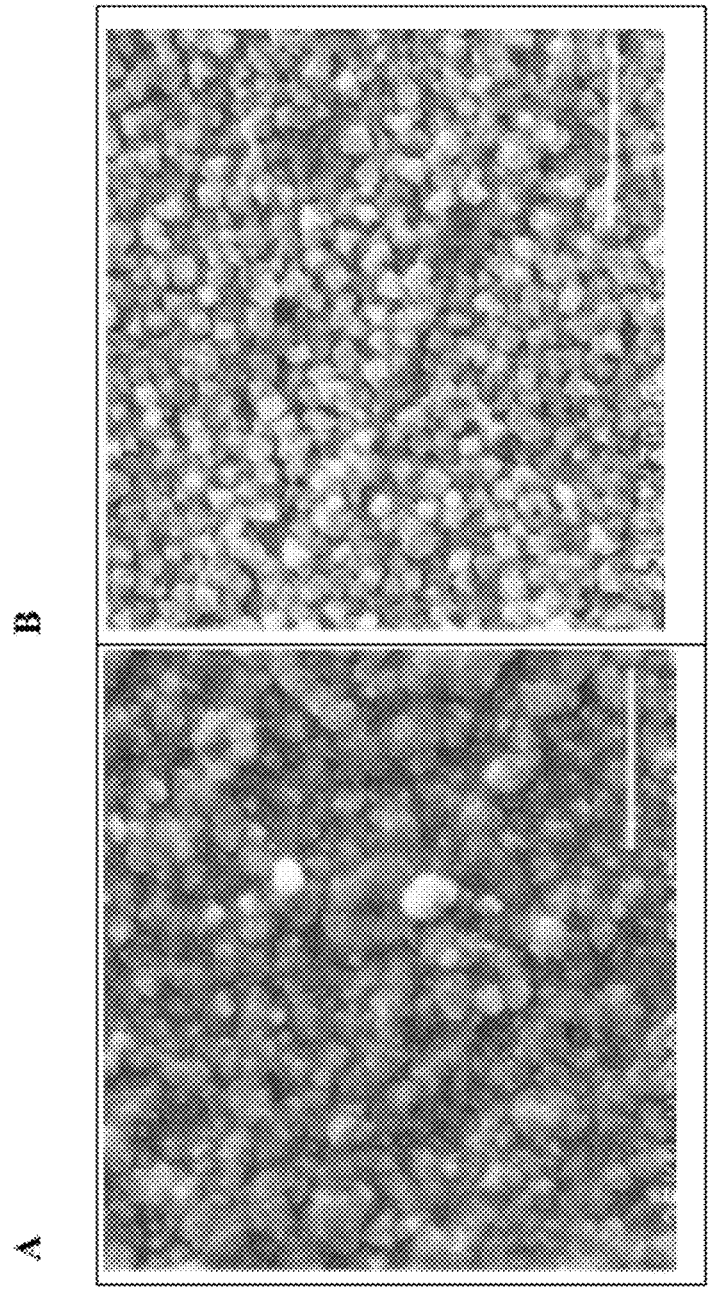
FIGS. 17A and 17B show surface views of uncoated and nanoceria coated 410 stainless, respectively, heated at 800° C. for 100 hours. The bar mark=10 μm.
Figure 18:
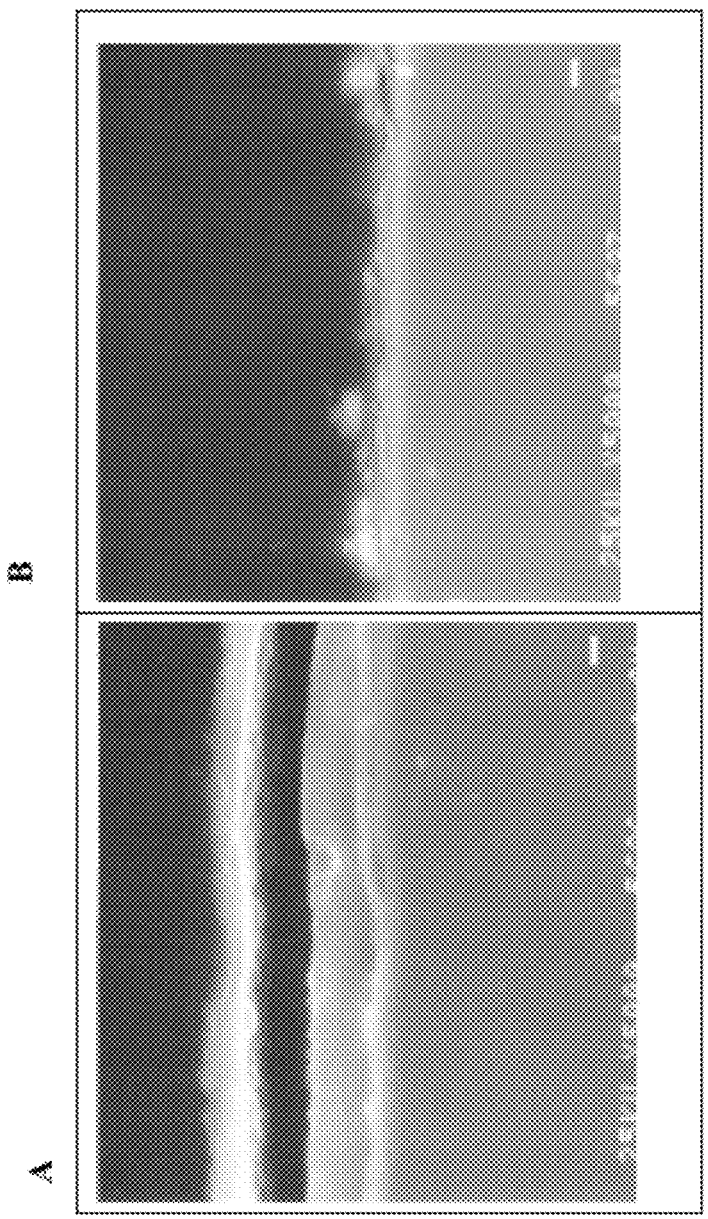
FIG. 18A shows a cross-section of the sample shown in FIG. 17A; sand 18B shows a cross-section view of the sample shown in FIG. 17B. The bar mark=1 μm. In A, the oxide layer is a few micrometers thick. In B, the oxide is very thin. The crystals shown in 17B are visible in cross section. The oxide in B is self-protective in many environments; the oxide in A is not self-protective when exposed to high temperature and/or corrosive environments.
Figure 19:
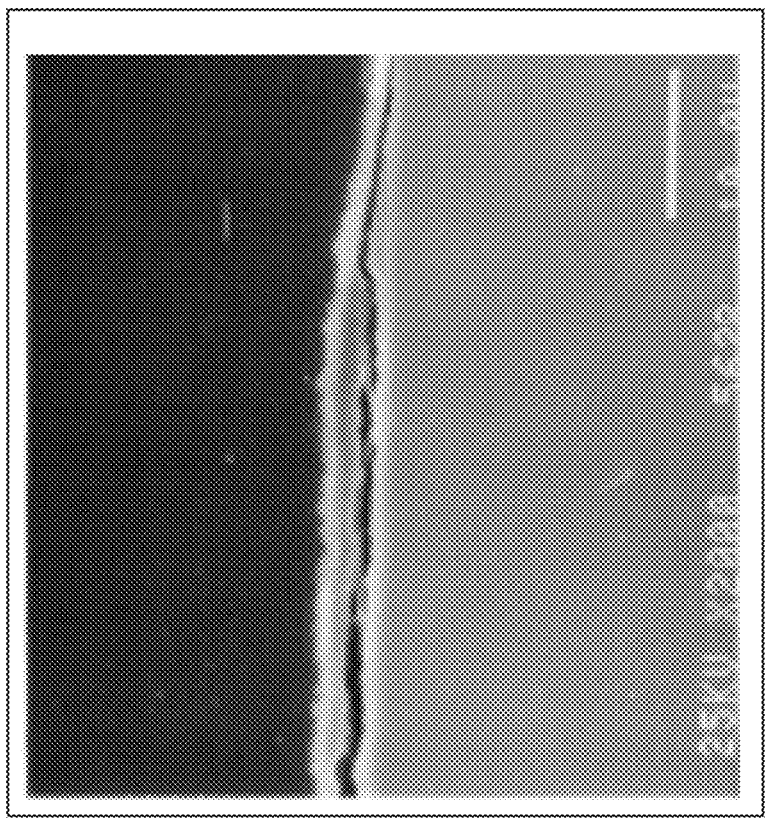
FIG. 19 shows a cross-section view of uncoated 410 stainless treated at 800° C. for 100 hours. Bar=10 μm. This view shows spalling oxide.
Figure 20:
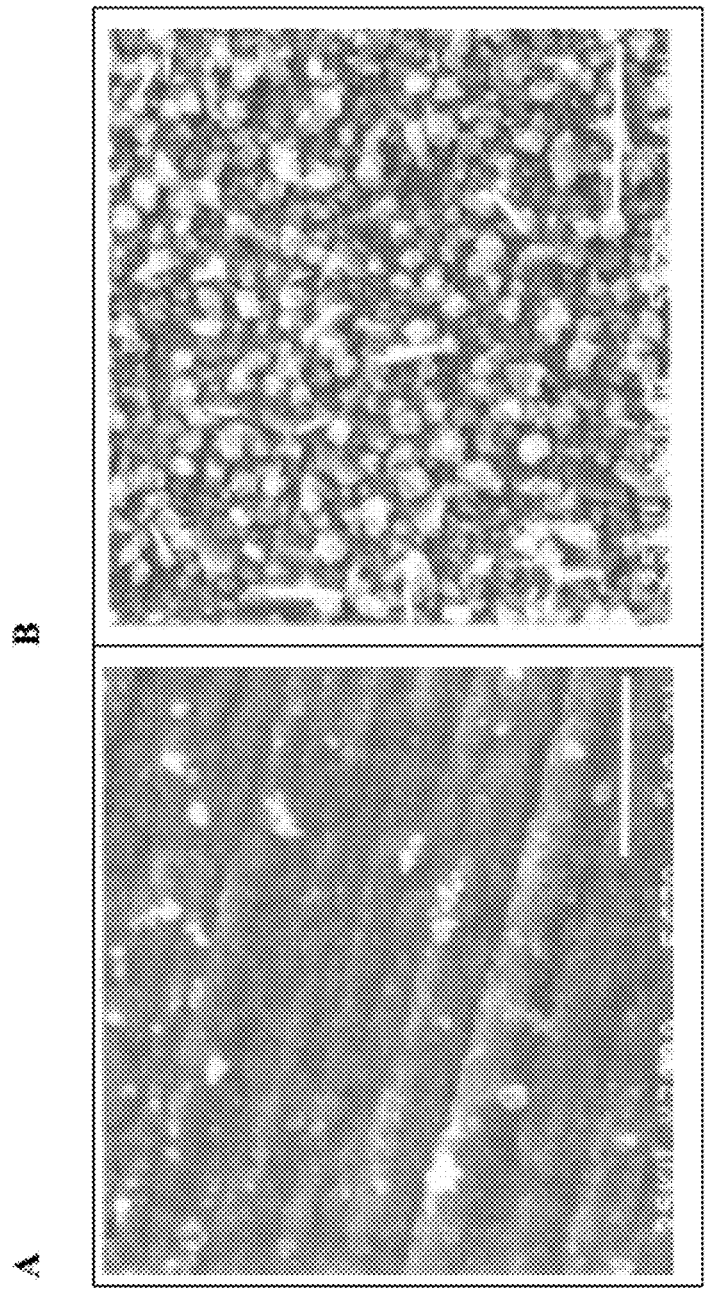
FIGS. 20A and 20B show surface views of uncoated and nanoceria coated 304L stainless, respectively, heated at 800° C. for 100 hours. The bar mark=10 μm. The oxide in B is self-protective in many environments; the oxide in A is not self-protective when exposed to high temperature and/or corrosive environments.
Figure 21:
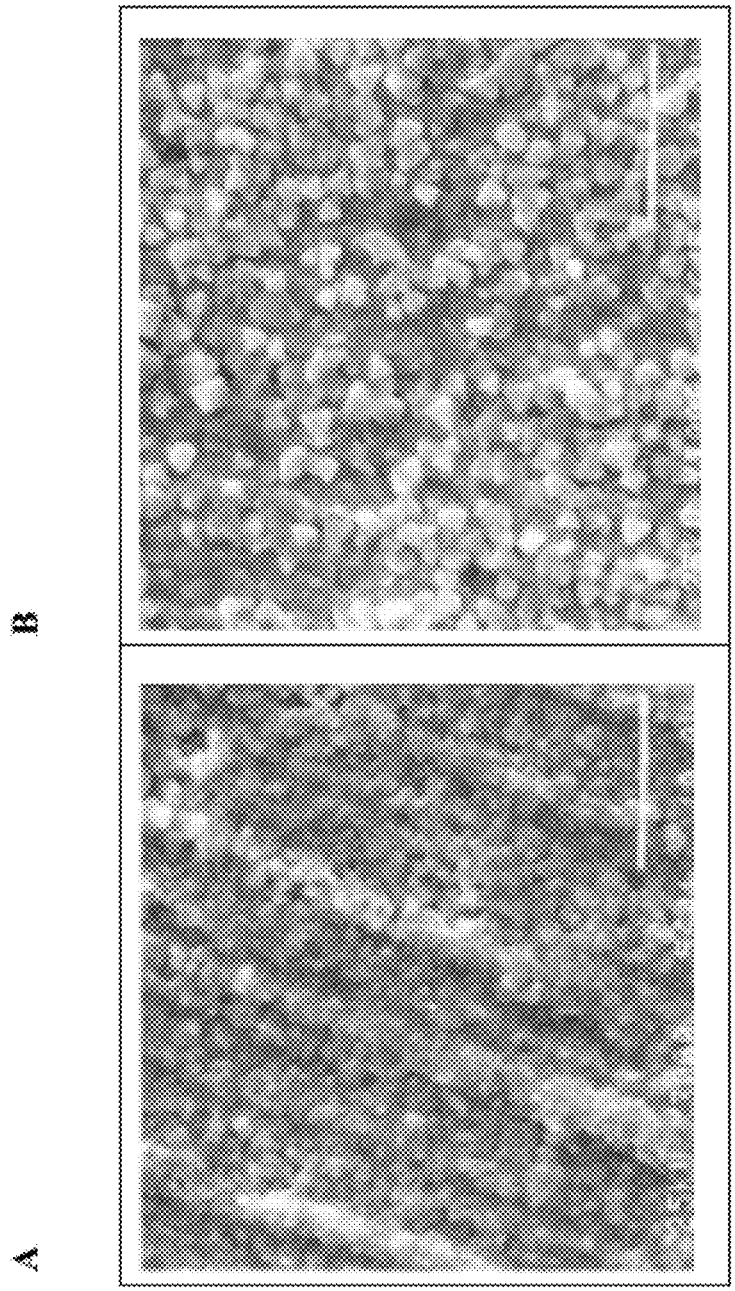
FIGS. 21A and 21B show surface views of uncoated and nanoceria coated 430 stainless, respectively, heated at 800° C. for 100 hours. The bar mark=10 μm. The oxide in B is self-protective in many environments; the oxide in A is not self-protective when exposed to high temperature and/or corrosive environments.

The substrate was analyzed by comparing the same surface treatment on austenitic, martensitic, and ferritic stainless steels. The oxidation resistance of coated stainless steels to stainless steels designed for high temperature applications, such as Allegheny 453 was compared. Results are shown in FIG. 16.

Extensive scanning electron microscopy and energy dispersive spectroscopy (SEM/EDS) was conducted on nanoceria coated and uncoated specimens (FIGS. 17-21). The specimens were rough polished (through 400 grit silicon carbide). Those that were treated were treated with Material Interface manufactured nanoceria, particle size 3.5 nm.

All of the nanoceria coated samples outperformed the uncoated samples. Results are shown in Table 4.

TABLE 4

| | EDS, Weight % | | |
|---|---|---|---|
| | 410 Bulk | 410 Uncoated General | 410 Coated Crystal |
| O | — | 14.4 | 17.7 |
| Al | — | 0.1 | 0.1 |
| Si | 0.3 | 0.3 | 1.1 |
| Cr | 12.3 | 49.0 | 38.9 |
| Mn | 0.5 | 10.3 | 19.1 |
| Fe | 86.3 | 25.0 | 19.1 |
| Ni | 0.4 | 0.5 | — |
| Cu | 0.2 | 0.4 | 4.1 |

TABLE 5

EDS analysis of surfaces illustrated above, after heating to 800° C. for 100 hours.

| | 304L Bulk | 304L Uncoated General oxide | 304L Ceria Coated Crystal | 430 Bulk | 430 Uncoated General oxide | 430 Ceria Coated Crystal |
|---|---|---|---|---|---|---|
| O | — | 13.6 | 22.0 | — | 14.6 | 16.0 |
| Al | — | 0.1 | 0.6 | — | 0.2 | 0.4 |
| Si | 0.3 | 0.8 | 0.4 | 0.3 | 0.2 | 0.8 |
| Cr | 18.4 | 36.2 | 42.2 | 16.2 | 48.7 | 35.4 |

TABLE 5-continued

EDS analysis of surfaces illustrated above, after heating to 800° C. for 100 hours.

|  | 304L Bulk | 304L Uncoated General oxide | 304L Ceria Coated Crystal | 430 Bulk | 430 Uncoated General oxide | 430 Ceria Coated Crystal |
|---|---|---|---|---|---|---|
| Mn | 1.9 | 7.1 | 20.5 | 0.3 | 9.8 | 12.5 |
| Fe | 70.6 | 38.0 | 11.2 | 82.9 | 25.9 | 34.1 |
| Ni | 8.3 | 3.9 | 1.2 | 0.2 | — | 0.2 |
| Cu | 0.5 | 0.4 | 1.8 | 0.1 | 0.7 | 0.8 |

Data are in weight percent of elements above atomic number 7 within 2 μm of the surface.

The data in Table 5 show that the nanoceria-coated stainless surfaces have chromium-rich crystals on their surfaces. The uncoated samples also have chromium-rich oxides, but those oxides are thicker and less adherent. The crystals on the surface of the ceria-coated samples are also Mn-rich. The presence of even the small concentration of nanoceria on the surface of the alloys has a large effect on the growing surface oxide chemistry, topography, and adhesion.

Figure 26:
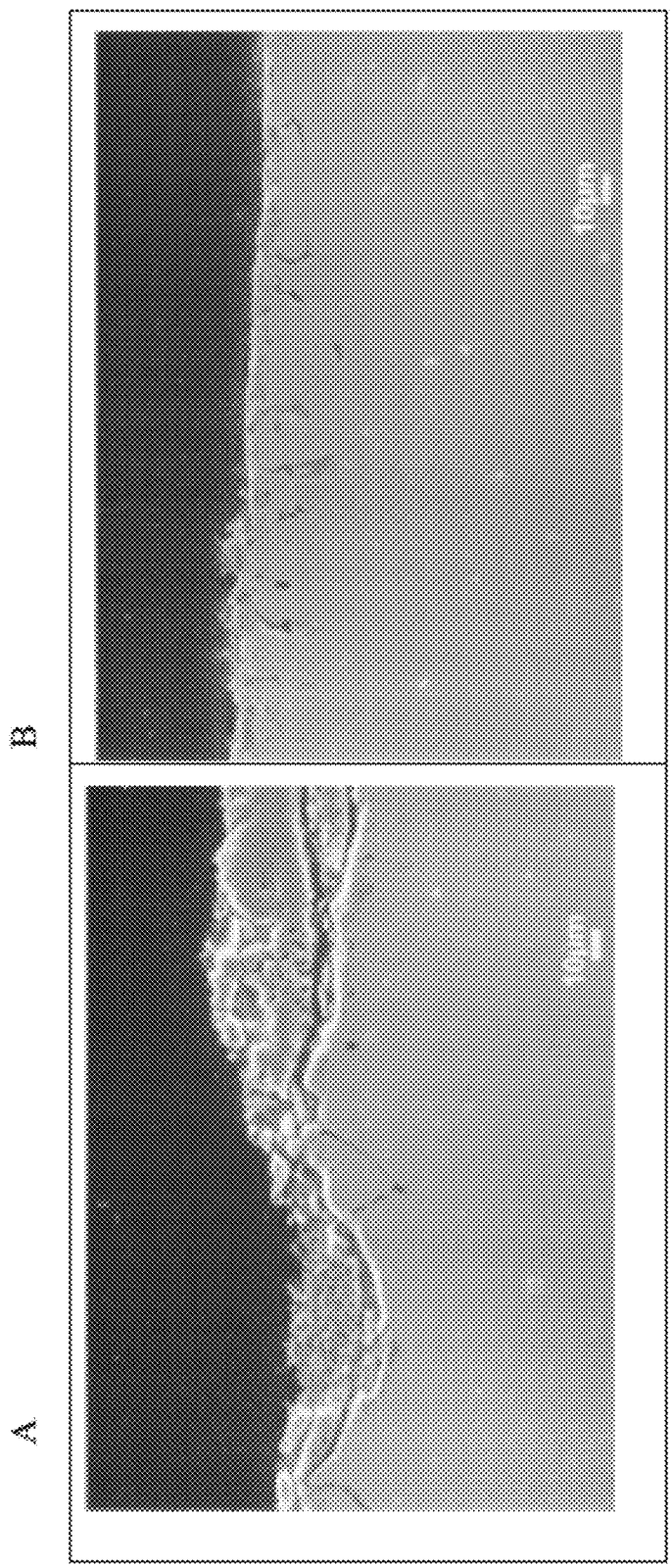
FIGS. 26A and 26B show cross sectional views of micrographs of uncoated and nanoceria-coated 316 stainless, respectively, heated at 1000° C. for 34 hours. The bar mark=10 μm.

Polished 316 stainless was heated to 1000° C. and analyzed with SEM. The results are shown in FIG. 26. The nanoceria-coated 316 has substantially better integrity than the uncoated sample for the length of the 34-hour test. There is some sub-surface oxidation on the nanocoated sample. The uncoated sample has severe spalling and flaking.

Humidity Testing

Samples of nanoparticle-coated and uncoated 304, 321 and 430 stainless steels were exposed to 350° C. with 95% humidity for 45 hours. The mass gain data are summarized in Table 6 below.

TABLE 6

Results of initial humdity testing. Samples were exposed to 95% humidity for 45 hours at 350° C.

| Alloy | Mass gain, kg/m² Nanocrystalline coated | Mass gain, kg/m² Uncoated alloys |
|---|---|---|
| 304 | 0.00000 | 0.00034 |
| 321 | 0.00000 | 0.00046 |
| 430 | 0.00000 | 0.00072 |

For the six samples tested, there was no mass gain on any of the nanocrystalline-coated alloys. All of the uncoated alloys gained mass, with the 430 stainless gaining the most.

Nickel Alloys

Figure 22:
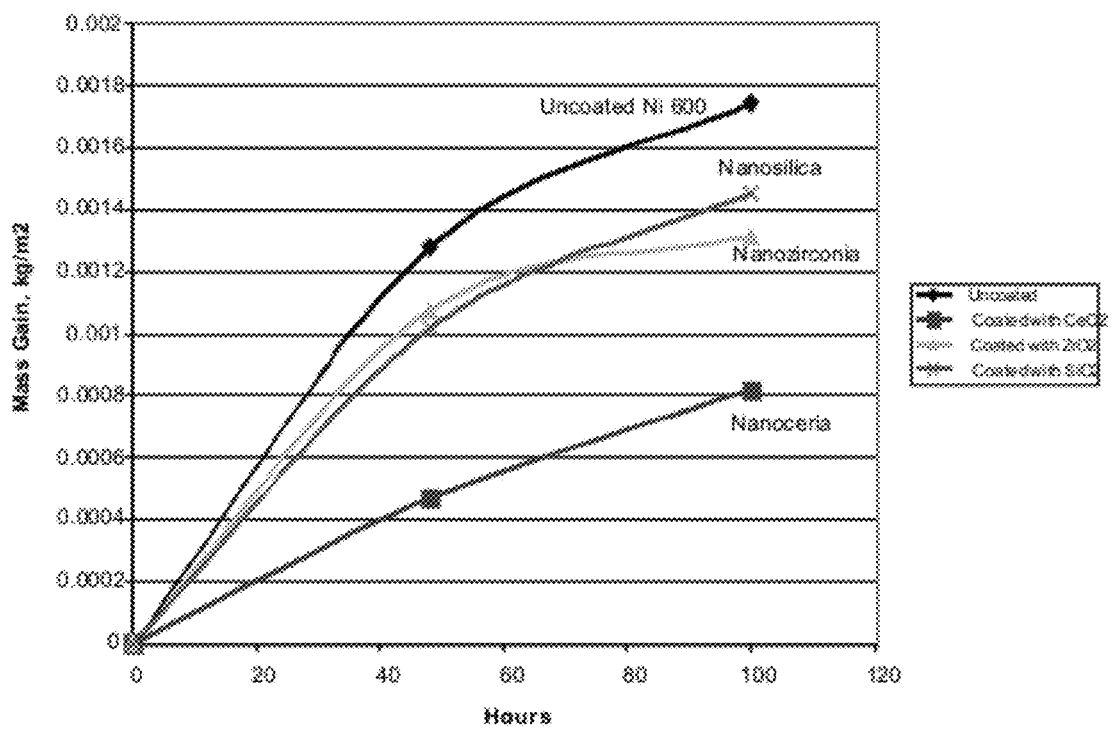
FIG. 22 shows a plot of mass gain over time of Nickel 600 alloy exposed to 800° C., both uncoated and coated with the indicated nanoparticles.

Initial testing was conducted on Nickel 600 alloy, a high temperature super alloy. Tests were performed on treated and untreated Nickel 600. The nominal composition of Nickel 600 is Ni—72.0, Cr—14-17, Fe—6-10, Al—0.35max, Ti—0.50max, Mn—1.00max, S—0.015max, Si—0.50max, Nb+Ta—1.0max, Co—1.0max, Cu—0.50max, C—0.15max. Uses of the material include furnace muffles, electronic and electrical components, jet engine parts, springs, chemical and food processing equipment, and bellows. The results of the tests are shown in FIG. 22.

Figure 23:
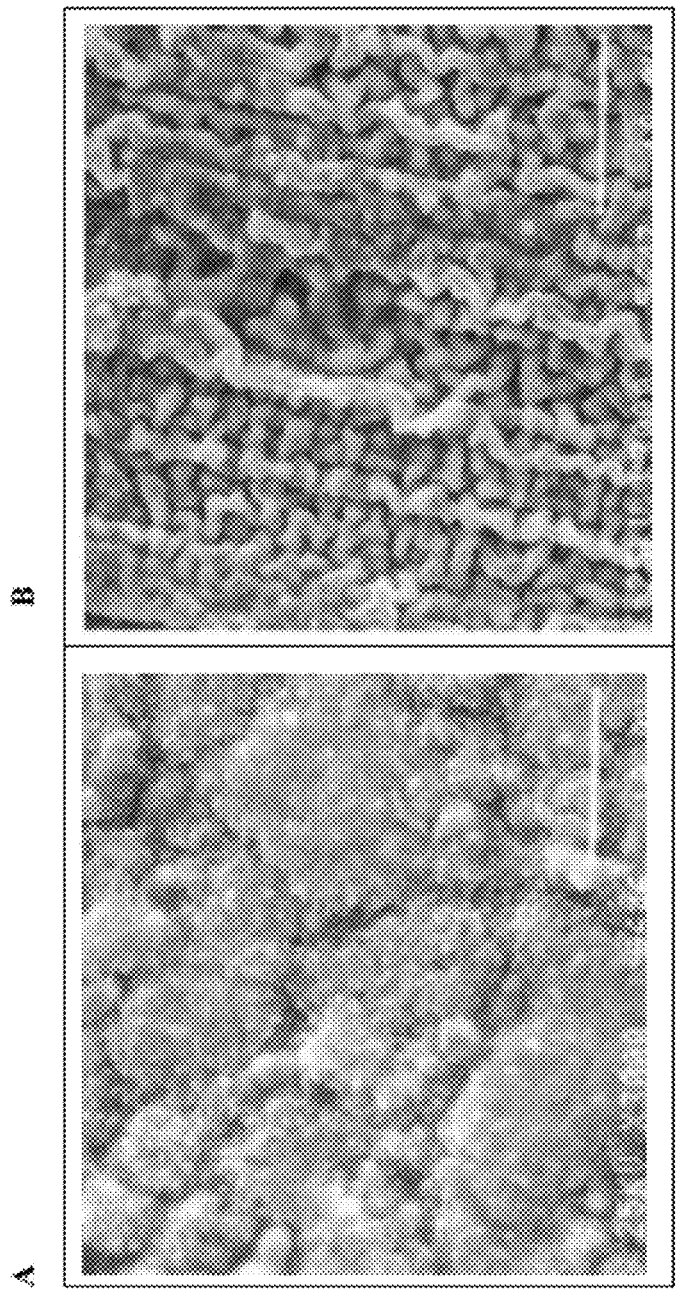
FIGS. 23A and 23B show surface views of micrographs of Nickel 600 alloy exposed to 800° C., both uncoated (A) and coated with nanoceria (B). Some of the parallel surface structure in (B) is due to the polishing lines on the sample. These are obliterated and totally covered with a heavy oxide on the uncoated sample (A). The oxide in B is self-protective in many environments; the oxide in A is not self-protective when exposed to high temperature and/or corrosive environments.
Figure 24:
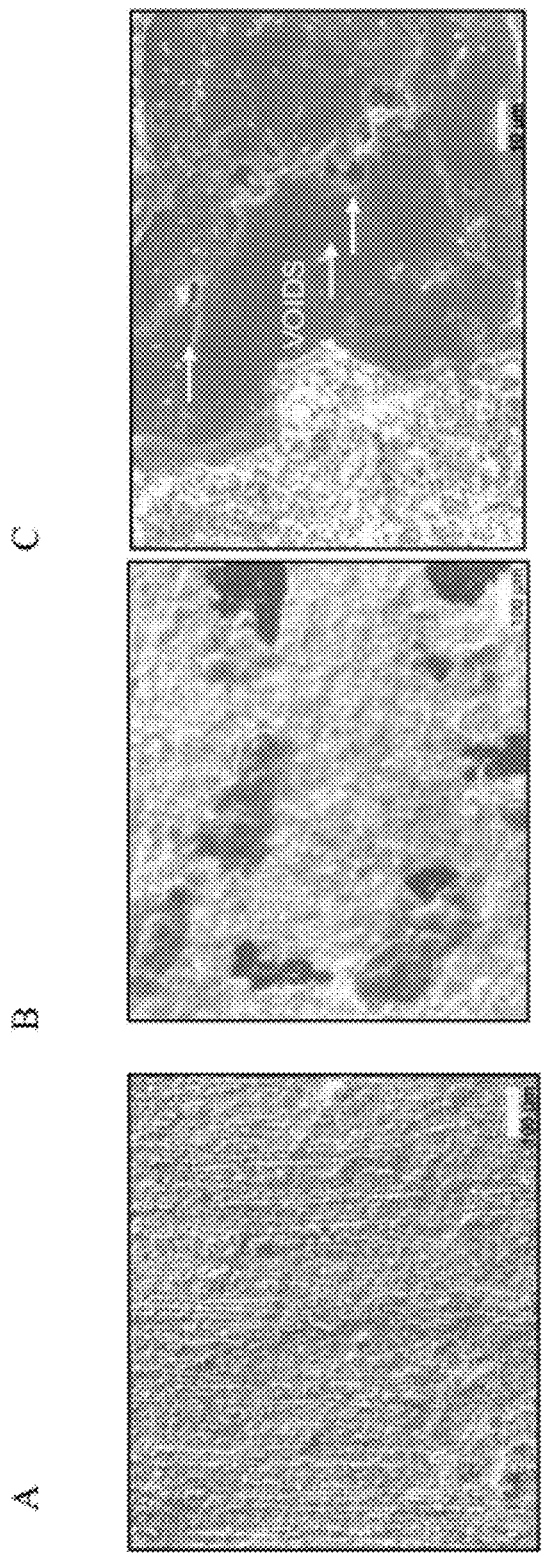
FIGS. 24A-C show surface views of micrographs of Nickel 600 alloy showing the effect of a nanoparticle surface treatment on the nucleation and growth of thermal oxides.

The samples were polished through 400 grit silicon carbide before exposure. Nanoceria has the lowest initiation rate, but purchased nanozirconia shows signs of a lower slope. Micrographs show different topography is present between the surface treatments (FIGS. 23A and 23B) because of the formation of the self-protective layer on the nanoparticle-treated surfaces.

An additional 527 samples were coated and tested in over 1358 experimental measurements. A full set of data from 410 stainless heated to 800° C. for 100 hours is shown in Table 7.

TABLE 7

Unprocessed data from 410 stainless heated to 800° C. for 100 hours.

| Coated | Pre-Heat (g) | Post-Heat 48 hrs | Post-Heat (g), 100 hrs | Mass Gain per Area (kg/m2), 48 hrs | Average Mass Gain per Area (kg/m2), 48 hrs | Std. deviation | Std. dev. × 100/Avg | Mass Gain per Area (kg/m2), 100 hrs | Average Mass Gain per Area (kg/m2), 100 hrs | Std. deviation | Std. dev. × 100/Avg |
|---|---|---|---|---|---|---|---|---|---|---|---|
| Uncoated | 6.3177 | 6.3185 | 6.319 | 0.001011 | 0.001054 | 0.00019311 | 18.3% | 0.001643 | 0.001559 | 0.00014598 | 9.4% |
|  | 6.6993 | 6.7003 | 6.7006 | 0.001264 |  |  |  | 0.001643 |  |  |  |
|  | 6.395 | 6.3957 | 6.3961 | 0.000885 |  |  |  | 0.001391 |  |  |  |
| Ceria | 6.4317 | 6.4322 | 6.4325 | 0.000632 | 0.000590 | 7.299E−05 | 12.4% | 0.001011 | 0.000843 | 0.00014598 | 17.3% |
|  | 6.3735 | 6.374 | 6.3741 | 0.000632 |  |  |  | 0.000759 |  |  |  |
|  | 6.4642 | 6.4646 | 6.4648 | 0.000506 |  |  |  | 0.000759 |  |  |  |
| ZrO2 | 6.2629 | 6.2637 | 6.264 | 0.001011 | 0.001011 | 0.00000 | 0.0% | 0.001391 | 0.001580 | 0.00027 | 17.0% |
|  | 6.3239 | 6.3247 | 6.3253 | 0.001011 |  |  |  | 0.001770 |  |  |  |
| SiO2/Al2O3 | 6.319 | 6.3201 | 6.3203 | 0.001391 | 0.001264 | 0.00018 | 14.1% | 0.001643 | 0.001643 | 0.00000 | 0.0% |
|  | 6.6101 | 6.611 | 6.6114 | 0.001138 |  |  |  | 0.001643 |  |  |  |
| Uncoated | 6.2623 | 6.2631 | 6.2634 | 0.001011 | 0.001075 | 0.00009 | 8.3% | 0.001391 | 0.001580 | 0.00027 | 17.0% |
|  | 6.3111 | 6.312 | 6.3125 | 0.001138 |  |  |  | 0.001770 |  |  |  |
| Ceria | 6.3141 | 6.3144 | 6.3146 | 0.000379 | 0.000632 | 0.00036 | 56.6% | 0.000632 | 0.000885 | 0.00036 | 40.4% |
|  | 6.2705 | 6.2712 | 6.2714 | 0.000885 |  |  |  | 0.001138 |  |  |  |
| ZrO2 | 6.3687 | 6.3695 | 6.3698 | 0.001011 | 0.001201 | 0.00027 | 22.3% | 0.001391 | 0.001643 | 0.00036 | 21.8% |
|  | 6.3777 | 6.3788 | 6.3792 | 0.001391 |  |  |  | 0.001896 |  |  |  |
| SiO2/Al2O3 | 6.4516 | 6.4524 | 6.4531 | 0.001011 | 0.001075 | 0.00009 | 8.3% | 0.001896 | 0.001833 | 0.00009 | 4.9% |
|  | 6.277 | 6.2779 | 6.2784 | 0.001138 |  |  |  | 0.001770 |  |  |  |

Data are presented to show relatively low standard deviation of the data (columns 8 & 12).

The presence of nanoceria surface treatment had a large effect on the nucleation rate of oxidation.

Figure 25:
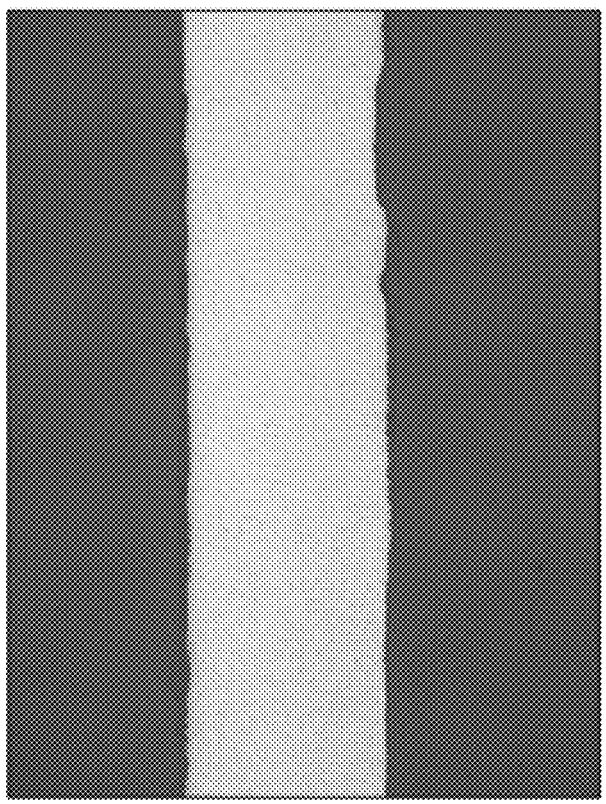
FIGS. 25A and 25B show cross-sectional views of micrographs of untreated (panel A) and treated (panel B) aluminum alloy surfaces exposed to hot, acidic conditions.
Figure 25:
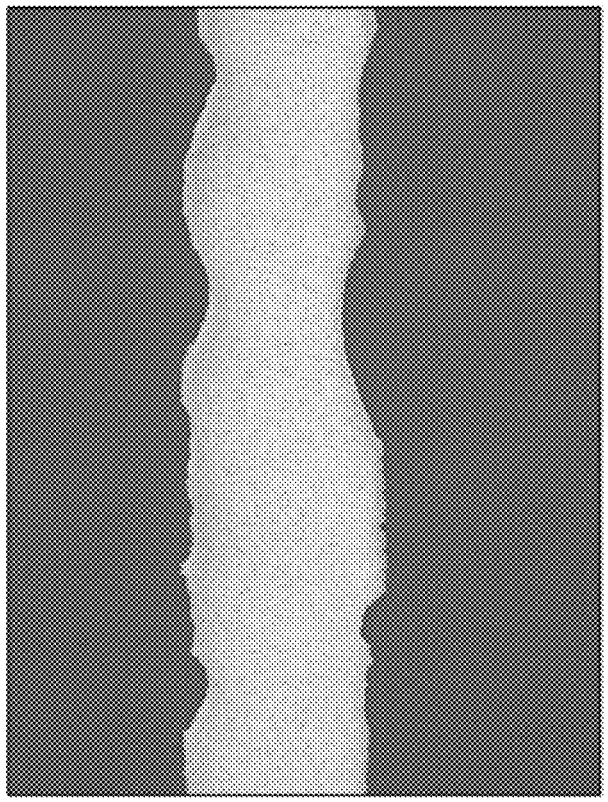

Similar results are seen in treatment of aluminum samples. FIG. 25 shows a comparison of untreated (panel A) and treated (panel B) aluminum exposed to hot, acidic conditions. The untreated sample lost up to 33% of its thickness due to corrosion, while the treated sample shows minimal corrosion and loss.

Example 5

Process Improvements

This example describes process improvements for the surface treatment of samples.
A. Removal of Toluene from the Process by Using Water-Based Manufacturing Process or by Using Pre-Manufactured Nanoparticles.

Toluene is both environmentally hazardous and expensive. The current method for manufacturing nanoparticles utilizes toluene; the particles are ultimately in a toluene suspension. Toluene is highly flammable and can cause damage to health by long term inhalation. Water-based methods to manufacture particles is the preferable method for environmental and safety reasons. In some embodiments of the present invention, alternative dispersion methods for aqueous solutions are used.

Known methods of manufacturing of nanoceria (and other nanoparticles) with water-based formulations are utilized (Ahniyaz et al J. of Nanoscience and Nanotechnology, 4 233-238 (2004) for a $CeO_2/ZrO_2$ solid solution and Chen et al Colloids and Surfaces A; 242 (2004) 61-69 (2004) for pure $CeO_2$). These procedures are duplicated to determine the quality of the nanoceria produced.
B. Making the Application Method Operator-Independent Methods are refined to make the application method increasingly operator-independent. These different methods include aspiration (particularly for water based methods), brushing methods, sponging, dipping, rolling, and the use of aerosol methods such as air guns and paint sprayers, mist sprayers and nebulizers. Development work is done as to how to coat unusually shaped components, like tubing and ductwork.

In some embodiments, surfactants are used to increase surface treatment adhesion and improve coverage. The requirement for post-surface treatment cure or baking are also investigated.
C. Different Alloy Types Additional alloys including nickel alloys, superalloys, and Haynes 214 (with rare earth additions), aluminum alloys, and low carbon steel are investigated using the methods described in Examples 1-4.
D. Plasma Spray Techniques In some embodiments, Plasma Spray and Solution Plasma Spray are used to apply the surface treatment, the substrate metal, e.g., with nano-powders of ceria and ceria-zirconia. In the Air Plasma Spray (APS), the nanopowders are agglomerated using a Spray Drier to a particular size before spraying. The agglomerated powders are sprayed using a APS gun to coat the steel substrate.

A SPSS (solution plasma spray) system, which utilizes the flow of precursor solution through a plasma flame, is also evaluated. The surface treatments are analyzed for porosity and hardness. Scratch test and SEM are used to evaluate the erosion resistance. The surface treatments are further exposed to in-situ oxidation kinetics and the results are compared to dip dry surface treatments Example 6

Heat Treatment

A. Stainless Steel Pre-Treatment Solution

Stainless steels that are solution-annealed in air generally have significant oxide scaling problems (in contrast to materials heated in a vacuum environment). Experiments are conducted to determine the effect of a self-protective oxide film obtained as a result of nanoparticle surface treatment, on the reduction of scale formation during atmospheric (i.e., non-inert, non-vacuum) heat treating of stainless steel. Various grades of stainless steel are heat treated for typical durations. Examples include impellers made from 410 stainless that have been solution annealed. This type of structure is heat treated to 1850° F. (1000° C.) for 1 hour/inch of material. Comparisons are made between coated and uncoated surfaces and the efficiency of the processes are compared.

A 410 stainless turbine blade was heat treated to determine if the coated blade could withstand 1000° C. temperatures for 1 hour. Thin oxide formed in coated zone; spalling oxide formed in uncoated zone. See FIG. 3. The sample did oxidize, but it is a thin self-protective oxide coating rather than a thick and scaling oxide such as can be damaging.
B. Stainless Steel Continuous Furnace Belts Some continuous belt furnaces have stainless steel belts that are used to transport samples for heat treating. FIGS. 27A and 27B show two examples such furnaces, although the applications of the present invention are not limited to any particular configuration. These belts need periodic replacement. Failure can be due to stretching, fatigue, embrittlement, or damaging oxidation. When the samples are heat treated in an inert atmosphere and are able to be cooled before exposure to the atmosphere, damage from oxidation is less of an issue. However, if the belts are still hot when exposed to the air, replacement of the belts due to oxidative material loss is required. Belt replacement due to damaging oxidation is estimated to occur 10-25% of the time. Large belts, like the one on the right, can range from $10-20,000 in price and require replacement on an annual basis.

As indicated in Example 6, the methods and compositions of the present invention provide ways of treating steel and other alloys at atmospheric conditions with ultimate successful reduction in damaging oxide formation and spalling. Experiments are conducted to determine if the nanoparticle surface treatments increase belt lifetime. Because of belt stretching and flexing, there will be constant exposure of fresh steel surface. The ability to treat materials at atmospheric conditions provides a way to treat belts continuously with nanocrystalline material. In preferred embodiments, an applicator to provide a mist/spray/or solution of nanocrystalline solution (water-based) is kept near (e.g., under) the furnace table such that the belt continuously passes through the solution/mist/spray, such that nanocrystalline materials is applied on a continual basis.

Variable designs for this "under table" method are built, comparing spray, mist and solution delivery systems.

Example 7

Use of Nanoparticle Surface Treatments in Humid Environments

This example describes the evaluation of nanocrystalline materials in humid environments. Corrosion tests are performed in laboratory autoclaves to investigate the corrosion resistance of the self-protective surfaces towards humid air and towards direct contact with liquid in the temperature range of 150° C. to 350° C. Multiple test conditions are performed. Each test is generally performed for a minimum of 100 hours. The samples are evaluated using scanning electron microscopy and optical microscopy.

Corrosion tests are also performed to investigate the corrosion resistance of the self-protective surface towards submerged service in high salinity solutions and towards the vapor phase above these solutions. Multiple test conditions are performed. Each test is generally performed for a minimum of 100 hours. The samples are evaluated using scanning electron microscopy and optical microscopy.

Example 8

Catalytic Activity of Nanoparticle Surface Treatments

The potential catalytic effect of reactive metals on oxidation reactions has been well documented. A series of oxidation tests is performed in laboratory autoclaves to investigate the potential catalytic effect of several nanoparticle surface treatments. Multiple test conditions are utilized.

The following reference are incorporated herein by reference in their entirety:

Ahniyaz, A, and T. Fujiwara, T. Fujino, and M. Yoshimura, J. of Nanoscience and Nanotechnology, 4 233-238 (2004).

Antill, J. & Peakhall, K. 1967 Influence of an alloy addition of yttrium on the oxidation behavior of an austenitic and a ferritic stainless steel in carbon dioxide. J. Iron Steel Inst. 205, 1136-1142.

Balducci, G., Catalysis Lett, 33,193 (1995).

Cabanas A., Darr, J. W., Lester, E., and Martyn, M, J. Mater. Chem. 11, 561 (2001).

Chen, H.-I. and H.-Y. Chang, Colloids and Surfaces A; 242 (2004) 61-69.

Colon, G., and Pijolat, M., Valdivieso, F., Kaspar, E., Finoccoio, E., Daturi, M., Binet, C., Lavalley, J. C., Baker, R. T., Bernaly, J. Chem. Soc, Faraday Trans., 94, 3717 (1998).

Duffy, D. M. & Tasker, P. W. 1986 Theoretical studies of diffusion processes down coincident tilt boundaries in NiO. Phil. Mag. A 54, 759-771.

Giggins, C. S., Kear, B. H., Pettit, F. S. & Tien, J. K. 1974 Factors affecting adhesion of oxide scales on alloys. Metall. Trans. 5, 1685-1688.

Hu, Michael Z-C, Payzant, E. A., Byers, C. H., J. of Colloid and Interface Science., 222, 20-36 (2000).

Kuznetsova, T. G., Sadykov, V. A., Veniaminov, S. A., Alikina, G. M., Moroz, E. M., Rogov, V. A., Martyanov, O. N, Yudanov, V. F., Abornev, I. S., Neophytides., S., Catalysis Today, 91-92 (2004) 161-164.

Li, Y. H., Chen W. F., Zhou, X. Z., Gu., Z. Y., Chang M. C., Materials Letters 59 (2005) 48-52.

Patil, S., Kuiry, S. C., Seal, S. & Vanfleet, R. 2002 Synthesis of nanocrystalline ceria particles for high temperature oxidation resistant coating. J. Nanoparticles Research 4, 433-438.

S. Patil, S. C. Kuiry & Seal, S. 2003 Nanocrystalline Ceria Imparts Better High Temperature Protection, Proceedings of the Royal Society, in press.

Pint, B. A., 2001 High temperature corrosion behavior of iron aluminide alloys and coatings, NTIS report, contract AC05-00OR22725, and other NTIS reports.

Pint, B. 2003 Optimization of reactive-element additions to improve oxidation performance of alumina-forming alloys. J. American Ceramic Society, 86, 686-695.

Ravi, M, Pillai, U. T. S., Pai, B. C., Damodaran, A. D., Dwarakadasa E. S., Metallurgical and Materials Transactions A., 33 391-400 (2002).

Riffard, F. Buscail H, Caudron, E., Cueff R., Issartel, C., & Perrier, S., Effect of yttrium addition by sol-gel coating and ion implantation on the high temperature oxidation behavior of the 304 steel. Applied Surface Science, 199, 107-122 (2002).

Riffard, F. Buscail H, Caudron, E., Cueff R., Issartel, C., & Perrier, S., Surface Engineering, 20, 440-446 (2004).

Seal, S., Bose, S. K. & Roy, S. K. 1994 Improvement in the oxidation behavior of austenitic stainless steels by superficially applied cerium oxide coatings. Oxid. Met. 41, 139-178.

Seal, S., Roy, S. K., Bose, S. K. & Kuiry, S. C. 2000 Ceria based high temperature coatings for oxidation prevention. J. Mater. (Electronic) 52(1), 1-8.

Seal, S. Kuiry, S. C. & Braco A. Leyda 2001 Studies on the surface chemistry of oxide films formed on IN-738LC super alloy at elevated temperatures in dry air. Oxid. Met. 56, 583-603.

Seal, S., Kuiry, S. C. & Braco A. Leyda 2002 Surface chemistry of oxide scale on IN-738LC superalloy: effect of long term exposure in air at 1173 K. Oxid. Met 57, 297-322.

Simon, C., Haugsrud, R., M. Mussiani, Barison, S., Walmsley, J., Jacques, T., Bredesen, R., Materials Science Forum, V461-464, 281-288 (2004).

Stringer, J. 1998 Coatings in the electricity supply industry: past, present, and opportunities for the future, Surface and Coatings Technology 108-109 1-9.

Stringer, J., Hed, A. Z., Wallwork, G. & Wilcox, B. A. 1972 The effect of thoria dispersion on the high temperature oxidation of chromium. Corros. Sci. 12, 625-636.

Stringer, J. 1989 The reactive element effect in high-temperature corrosion. Mater. Sci. Engg. Al20, 129-137.

Trovalli, A., Leitenburg, C., Dolcetti., Chemtech 32, June, 1997.

Tien, J. K. and Pettit, F. S. 1972 Mechanism of oxide adherence on Fe-25Cr-4Al (Y or Sc) alloys. Metall. Trans. 3, 1587-1599.

Wang, C., Jiang, F., and Wang, F., Oxidation of Metals, 62 (2004) 1-13.

Shen Jianian, et al., Effect of superficially applied ceria on high temperature oxidation behavior of Fe25Cr alloy. Sci. Prot. Tech. (1992) 4(4) 289-294.

Nagai, H., et al., The influence of dispersion and superficial application of rare earth oxides on the high temperature oxidation of Fe-20Cr sintered alloy. Funtai oyobi Funmatsu Yakin (1987) 34(5), p. 222-228

Liu, Z., et al., Modeling of oxidation kinetics of Y-doped Fe—Cr—Al Alloys. Oxidation of Metals (2000) 53(3/4), 341-349

Mitra, S. K., et al., Influence of superficial coating of $CeO_2$ on the oxidation behavior of AISI 304 stainless steel. Oxid. Met. (1993) 39(3/4), p. 221-229

All publications and patents mentioned in the above specification are herein incorporated by reference. Various modifications and variations of the described methods and systems of the invention will be apparent to those skilled in the art without departing from the scope and spirit of the invention. Although the invention has been described in connection with specific preferred embodiments, it should be understood that the invention as claimed should not be unduly limited to such specific embodiments. Indeed, various modifications of the described modes for carrying out the invention that are obvious to those skilled in the relevant fields are intended to be within the scope of the following claims.

I claim:

1. A method of producing a self-protective oxide coating on the surface of an alumina- or chromia-forming metal alloy, comprising:
    a) treating a surface of an alumina- or chromia- forming base metal alloy with to a solution of nanoparticles of an oxide of an element that exhibits a reactive element effect, said solution having a concentration of nanoparticles of less than 5% by weight;
    b) drying said base metal alloy after said exposure to produce treated metal having nanoparticles dispersed on a treated surface, wherein said treated surface comprises a portion in contact with nanoparticles and a portion not in contact with nanoparticles, wherein the portion of said treated surface not in contact with nanoparticles is greater than the portion of said treated surface in contact with nanoparticles; and
    c) exposing said treated metal having nanoparticles dispersed on said treated surface to oxidizing conditions wherein in said oxidizing conditions, a self-protective oxide coating is formed on said treated surface of said treated metal to produce a protected metal surface, wherein said self-protective oxide coating is a thermal oxide formed by oxidation of said treated surface.

2. The method of claim 1, wherein said element that exhibits a reactive element effect is selected from the group consisting of aluminum, silicon, scandium, titanium, yttrium, zirconium, niobium, lanthanum, hafnium, tantalum, cerium, and thorium.

3. The method of claim 1, wherein said oxidizing conditions comprise heating under atmospheric pressure.

4. The method of claim 1, wherein said base metal alloy is selected from the group consisting of stainless steel, nickel alloy and aluminum alloy.

5. The method of claim 4, wherein said stainless steel is selected from the group consisting of austenitic, ferritic, and martensitic stainless steel.

6. The method of claim 1, wherein said solution has a concentration of said nanoparticles of less than 1% by weight.

7. The method of claim 1, wherein said solution has a concentration of said nanoparticles of less than 0.5% by weight.

8. The method of claim 1, wherein said solution has a concentration of said nanoparticles of less than 0.2% by weight.

9. The method of claim 1, wherein said solution has a concentration of said nanoparticles of less than 0.1% by weight.

10. The method of claim 1, wherein said solution has a concentration of said nanoparticles of less than 0.05% by weight.

11. The method of claim 1, wherein said solution of nanoparticles is comprises toluene.

12. The method of claim 1, wherein said treating said base metal alloy with said solution comprises brushing, sponging, dipping, rolling, and/or spraying.

13. The method of claim 1, wherein said surface of said base metal alloy is a surface of a component comprising said base metal alloy and selected from the group consisting of fossil energy system components, heat treated samples, heat exchangers, reheater pipes, solar collectors/panels, refrigeration and heating equipment, vacuum and gas chambers, hydrogen fuel cell components, heat treating furnace components, flame stabilizers, surgical components, fan accessories, inlet-outlet transitions, automobile exhaust systems, aircraft components, tubular elements, and bearing rods and components that fail due to metal dusting corrosion.

14. The method of claim 1, wherein said solution of nanoparticles is an aqueous solution.

* * * * *